(12) United States Patent
Huen et al.

(10) Patent No.: US 10,592,171 B2
(45) Date of Patent: Mar. 17, 2020

(54) MULTI-STREAM SSD QOS MANAGEMENT

(71) Applicant: Samsung Electronics Co., Ltd., Suwon-si, Gyeonggi-do (KR)

(72) Inventors: Hingkwan Huen, Daly City, CA (US); Changho Choi, San Jose, CA (US); Derrick Tseng, Union City, CA (US); Jianjian Huo, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 387 days.

(21) Appl. No.: 15/167,974

(22) Filed: May 27, 2016

(65) Prior Publication Data

US 2017/0272494 A1    Sep. 21, 2017

Related U.S. Application Data

(60) Provisional application No. 62/309,446, filed on Mar. 16, 2016.

(51) Int. Cl.
*G06F 13/00* (2006.01)
*G06F 3/06* (2006.01)

(52) U.S. Cl.
CPC ............ *G06F 3/0679* (2013.01); *G06F 3/061* (2013.01); *G06F 3/0659* (2013.01); *G06F 3/067* (2013.01)

(58) Field of Classification Search
CPC ......... H04L 29/06523; H04L 29/08072; H04L 29/06027; H04L 29/06462; H04L 29/06; G06F 12/0246; G06F 2212/2022; G06F 2212/7211; G06F 12/02462; G06F 13/00; G06F 3/0679; G06F 3/061; G06F 3/0659; G06F 3/067; G11C 16/102

USPC .......................................... 709/231; 711/103
See application file for complete search history.

(56) References Cited

U.S. PATENT DOCUMENTS

| 8,874,835 | B1 | 10/2014 | Davis et al. |
| 9,141,528 | B2 | 9/2015 | Gorobets et al. |
| 2012/0072798 | A1 | 3/2012 | Unesaki et al. |
| 2012/0191900 | A1 | 7/2012 | Kunimatsu et al. |
| 2013/0159626 | A1 | 6/2013 | Katz et al. |

(Continued)

FOREIGN PATENT DOCUMENTS

| JP | 2006235960 A | 9/2006 |
| JP | 5723812 B2 | 5/2015 |

(Continued)

OTHER PUBLICATIONS

"Multi-Stream SSD Technology," Samsung Electronics Co., Ltd., Giheung Campus, (URL:http://www.samsung.com/semiconductor/global/file/insight/2015/12/0_storage-intelligence-prodoverview-2015-0.pdf), Aug. 1, 2015, 2 pages.

(Continued)

*Primary Examiner* — Robert B Harrell
(74) *Attorney, Agent, or Firm* — Renaissance IP Law Group LLP

(57) ABSTRACT

A system and method for satisfying Quality of Service (QoS) attributes (620) for a stream (405, 410) using a storage device (120) with multi-stream capability is described. The storage device (120) may include memory (510, 515, 520) to store data. A host interface (525) may receive requests (345, 350, 415, 420, 425, 430, 435, 440), some of which may be associated with a stream (405, 410). A host interface layer (545) may schedule the requests (345, 350, 415, 420, 425, 430, 435, 440) in a manner that may satisfy the QoS attribute (620) for the stream (405, 410).

14 Claims, 16 Drawing Sheets

(56) References Cited

U.S. PATENT DOCUMENTS

2015/0339235 A1 11/2015 Jung et al.
2016/0266792 A1 9/2016 Amaki et al.
2016/0283125 A1 9/2016 Hashimoto et al.
2016/0313943 A1 10/2016 Hashimoto et al.

FOREIGN PATENT DOCUMENTS

WO 2012020544 A1 2/2012
WO 2015005634 A1 1/2015

OTHER PUBLICATIONS

Kang, Jeong-Uk et al., "The Multi-streamed Solid-State Drive", 6th USENIX Workshop on Hot Topics in Storage and File Systems (HotStorage 14) (URL:https://www.usenix.org/node/183609), May 7, 2014, 5 pages.

Total Bandwidth

MULTI-STREAM SSD QOS MANAGEMENT

RELATED APPLICATION DATA

This application claims the benefit of U.S. Provisional Patent Application Ser. No. 62/309,446, filed Mar. 16, 2016, which is incorporated by reference herein for all purposes.

FIELD

This inventive concept relates to multi-streaming, and more particularly to enhancing multi-streaming to support Quality of Service attributes.

BACKGROUND

Multi-streaming Solid State Drives (SSDs) allow smart placement of incoming data to minimize the effect of internal Garbage Collection (GC) and reduce write amplification. Multi-streaming is achieved by adding a simple tag (stream ID) to each write request. Based on this tag, the SSD may group data into common erase blocks. To make use of multi-stream, data within the same stream should have at least one common attribute, for example, data life cycle.

But SSDs in general, and multi-streaming SSDs in particular, do not directly support Quality of Service (QoS) attributes. It is up to the host computer to provide support for any QoS attributes of streams and the software that generate stream requests.

A need remains for a way to improve the performance of multi-streaming devices to satisfy QoS attributes.

DETAILED DESCRIPTION

Figure 1:
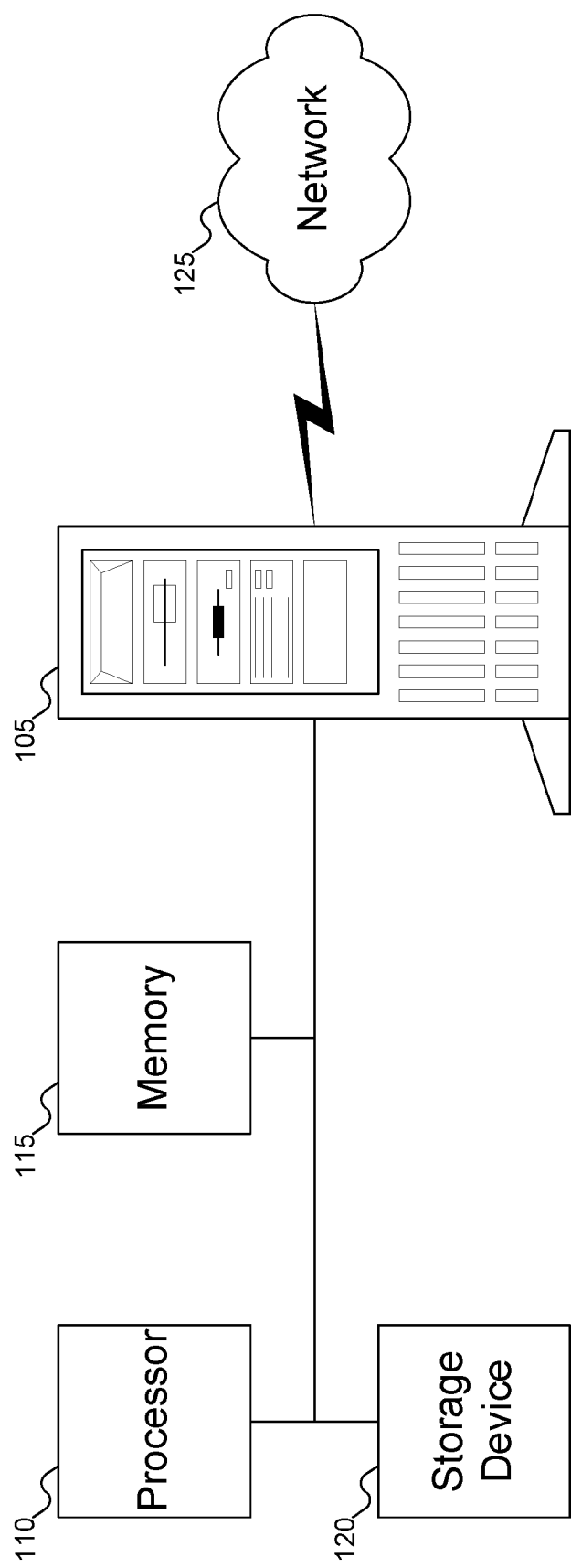
FIG. 1 shows a system including a storage device equipped to satisfy Quality of Service (QoS) attributes in a multi-streaming environment, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module might be termed a second module, and, similarly, a second module might be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Quality of Service (QoS) and Bandwidth Management are techniques commonly used to prioritize system and network traffic. Similar concepts may be introduced into Solid State Drives (SSDs) and other storage devices, such that appropriate input/output (I/O) types may utilize SSD and/or storage device resources in more efficiently.

Multi-stream technology has a well-defined framework. Using multi-stream technology, a host may effectively use the SSD by grouping write requests based on data lifetime. This framework may be expanded to include additional attributes including minimum and/or maximum bandwidth, stream priority, and maximum latency or preferred latency consistency level for each stream. These attributes may enable a stream to be used not only in the write operations, but also in read operations.

Each SSD has known limitations in terms of bandwidth and latency. That is, a given SSD has a maximum bandwidth that may be used to send and receive data, and a given SSD has a minimum latency needed to complete an I/O operation. Within these limitations, a host may set a fixed condition for a stream, requesting that the SSD provide certain minimum levels of service for the stream. The SSD may then allocate the remaining resources for other requests or streams. A host may specify a minimum and/or maximum bandwidth, a priority, or a maximum latency for each stream. When requests are sent to the SSD, the SSD may satisfy these requests in any manner that guarantees (or at least delivers a "best try" for) the requested QoS for the stream. If total demand for the SSD exceeds its capability, the SSD may make sure each stream gets its minimum QoS level (or as close as possible), and then use any remaining headroom to service other workload streams with equal or higher priority. This approach may replace the "first come, first served" strategy that is currently used to satisfy I/O requests.

In order to support QoS management, various operations may be enabled or enhanced in the multi-stream framework.

1) Open and Close Stream: Before a host may assign requests to a stream, the stream needs to be opened. When the host has completed I/O with the stream, the host may close the stream. Closing a stream releases any allocated resources back to the SSD.

2) Set Stream Minimum and/or Maximum Bandwidth: This command allows a host to set the minimum bandwidth for the specified stream. By default, a stream should receive as much bandwidth as the SSD may support: the SSD will use its full bandwidth when possible. But a stream has no minimum guaranteed level of service. When a stream sets a minimum bandwidth, the SSD will maintain the specified bandwidth for that stream, and use the remaining bandwidth to service other requests. Similarly, when a stream sets a maximum bandwidth, the SSD will maintain the bandwidth within this maximum limit. The SSD may have either, or both minimum and maximum bandwidth limitations.

3) Set Stream Priority Level: This command allows a host to set the priority level of the specified stream. By default, all streams are considered to have equal priority (the minimum priority level offered by the SSD). This command allows a host to specify a particular priority level for a stream. In an embodiment of the inventive concept, priority level 0 is considered the highest priority level and is always serviced first. Priority level 0 is reserved for requests that require real-time response. Priority level 0 also allows for finer control of latency.

4) Set Stream Maximum Latency: This command allows a host to set the maximum latency for the specified stream. When a stream's priority is set to the highest level (level 0), the SSD may use the maximum latency setting to service requests in a manner that provides better QoS.

5) Reset Stream Attributes: This comment allows a host to reset the attributes for a stream to the default values.

5) Query Stream: The existing multi-stream framework permits a host to query a stream's open/close status. Embodiments of the inventive concept permit the use of additional fields to provide a stream's QoS attribute settings, returning the stream's current minimum and/or maximum bandwidth, priority level, and maximum latency.

In addition to expanding the multi-stream framework, embodiments of the inventive concept may expose new fields, specifying the device's capabilities. These fields may include:

1) Stream QoS Attribute Support: A host may use this field to determine if the SSD supports stream QoS attributes such as bandwidth allocation, priority, and latency.

2) Maximum Bandwidth: A host may use this field to determine the total bandwidth the SSD may support. The bandwidth allocated for each stream, and the sum of all streams' allocated bandwidth, may not exceed this value.

3) Maximum Priority Level: A host may use this field to determine how many levels of stream priorities the SSD may support. In an embodiment of the inventive concept, priority level 0 may be reserved for real-time requests.

4) Minimum Latency: A host may use this field to determine the best latency the SSD may offer. The maximum latency setting for each stream may not be less than this value.

FIG. 1 shows a system including a storage device equipped to satisfy Quality of Service (QoS) attributes in a multi-streaming environment, according to an embodiment of the inventive concept. In FIG. 1, host machine 105 may include processor 110, memory 115, and SSD 120. Processor 110 may be any variety of processor: for example, an Intel Xeon, Celeron, Itanium, or Atom processor, an AMD Opteron processor, an ARM processor, etc. Memory 115 may be any variety of memory, such as non-volatile memory (e.g., flash memory), Static Random Access Memory (SRAM), Persistent Random Access Memory (PRAM), etc. but is typically Dynamic Random Access Memory (DRAM). Storage device 120 may be any variety of storage device capable of providing multi-stream support: for example, a Solid State Drive (SSD). While host 105 is depicted in FIG. 1 as a tower computer, host 105 may be replaced with any machine that offers comparable functionality, such as a laptop computer, server, or portable computing device, such as a smartphone, with no loss of generality.

Host 105 may also be connected to a network, such as network 125. Network 125 may be any variety of network, including a wired network or a wireless network, such as 802.11/a/b/g/ac network or a connectivity using Bluetooth® wireless technology. (Bluetooth is a registered trademark of Bluetooth SIG, Inc. in the United States.) Network 125 may also mix different types of networks, including both wired and wireless technology. Network 125 may be a local area network (LAN), a wide area network (WAN), a global network such as the Internet, or some combination thereof. Network 125 may permit other computers to access storage device 120.

Figure 2:
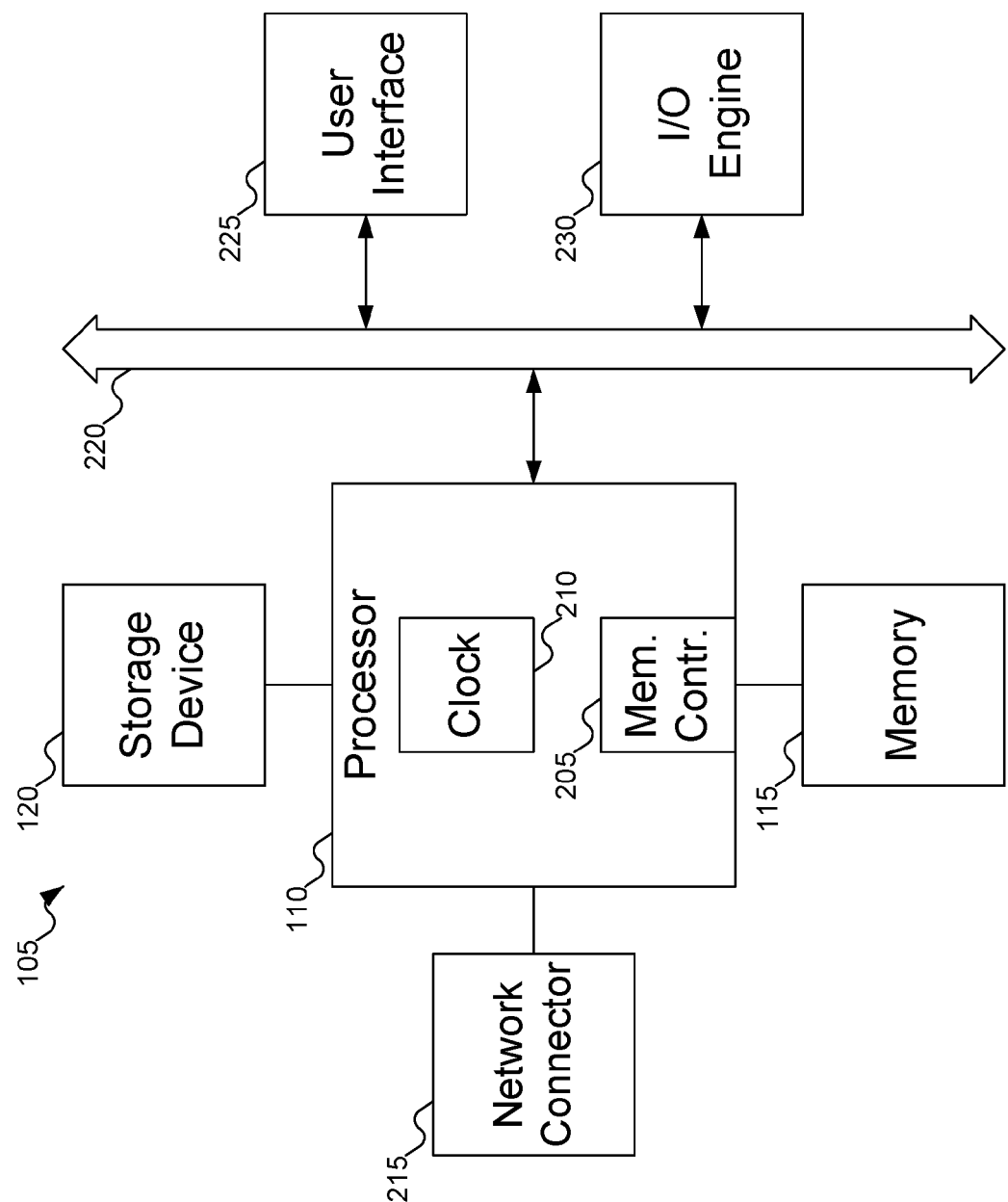
FIG. 2 shows additional details of the computer of FIG. 1.

FIG. 2 shows additional details of host 105 of FIG. 1. Referring to FIG. 2, typically, machine or machines 105 include one or more processors 110, which may include memory controller 205 and clock 210, which may be used to coordinate the operations of the components of machine or machines 105. Processors 110 may also be coupled to memory 115, which may include random access memory (RAM), read-only memory (ROM), or other state preserving media, as examples. Processors 110 may also be coupled to storage devices 120, and to network connector 215, which may be, for example, an Ethernet connector or a wireless connector. Processors 110 may also be connected to a bus 220, to which may be attached user interface 225 and input/output interface ports that may be managed using input/output engine 230, among other components.

Figure 3A:
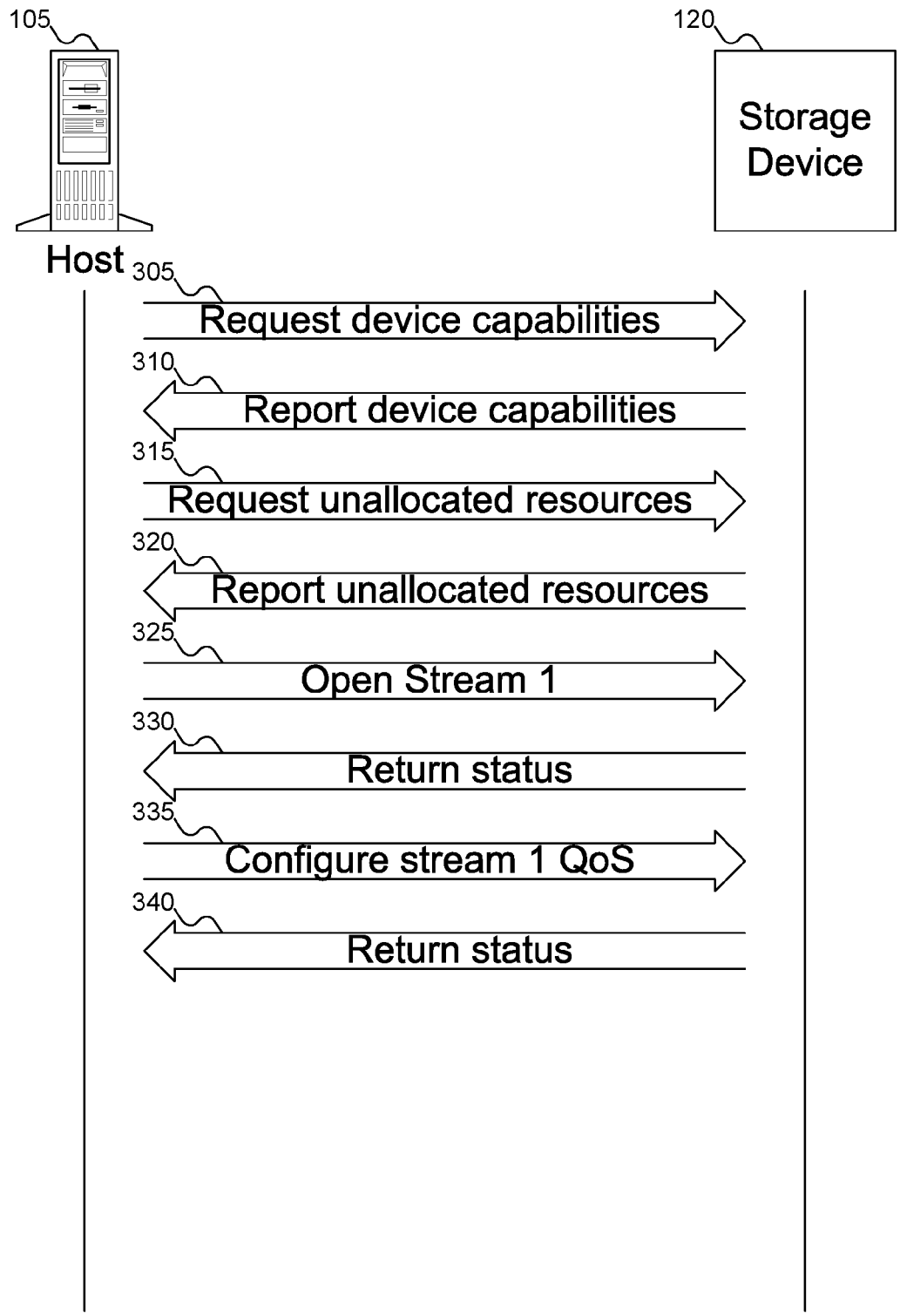
FIGS. 3A-3B show an exchange of information between the host of FIG. 1 and the storage device of FIG. 1, in an embodiment of the inventive concept.
Figure 3B:
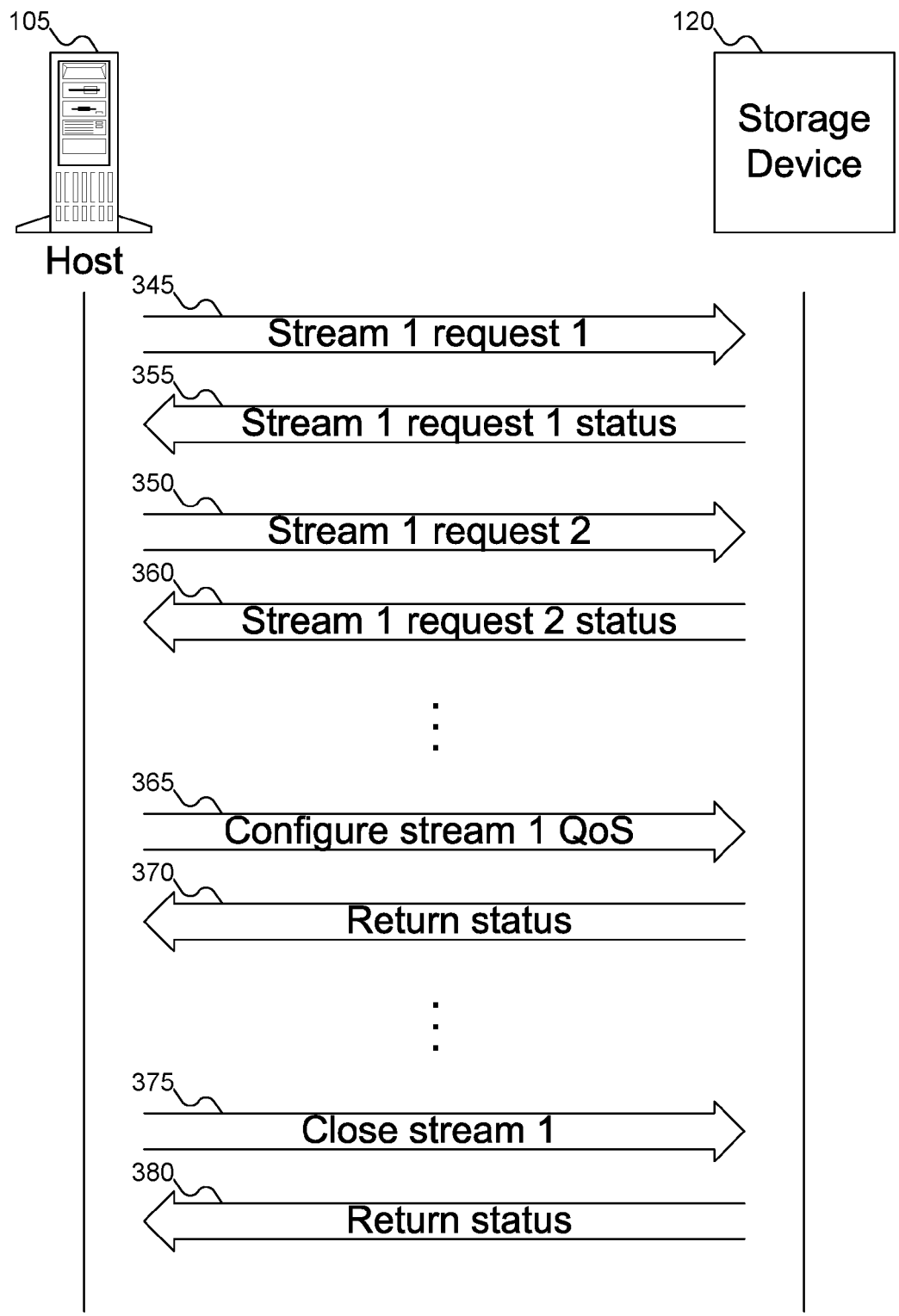

FIGS. 3A-3B show an exchange of information between host 105 of FIG. 1 and storage device 120 of FIG. 1, in an embodiment of the inventive concept. In FIG. 3A, host 105 may send capabilities request 305 to storage device 120, requesting the capabilities of storage device 120. These capabilities may include, for example, the maximum bandwidth storage device 120 may support, the total number of priorities storage device 120 may support, or the minimum latency required for storage device 120 to respond to a request. In capabilities response 310, storage device 120 may provide information about the capabilities of storage device 120.

In unallocated resources request 315, host 105 may request information about the unallocated resources of storage device 120: storage device 120 may send unallocated resources response 320, providing this information. For example, storage device 120 might be able to support a total bandwidth of 100 megabytes per second (MB/s), but might have already guaranteed some stream a minimum bandwidth of 30 MB/s. In that case, storage device 120 has only 70 MB/s of bandwidth as an unallocated resource—at least, as a resource that may be guaranteed for Quality of Service (QoS) purposes.

In some embodiments of the inventive concept, storage device 120 may only be able to support QoS attributes based on one resource of storage device 120. For example, if bandwidth is currently being used as a QoS attribute for one stream, storage device 120 might be limited to only using bandwidth for QoS attributes for any additional streams. If so, then unallocated resources response 320 (or capabilities response 310) may indicate what resource may currently be used by host 105 for QoS attributes. In this manner, host 105 may ensure that all QoS attributes use the same resource. By including this information in either unallocated resources response 320 or capabilities response 310, the requesting machine may be made aware of how storage device 120 is currently being used. This information may be useful if, for example, storage device 120 is being used as Network Attached Storage (NAS), and therefore may be accessed by multiple computers across network 125 of FIG. 1.

Note that there is a difference between unallocated resources for QoS purposes and available resources in terms of active use of storage device 120. For example, at the time storage device 120 sends response 320, storage device 120 might be idle, with no pending transactions. This would mean that, at the moment, storage device 120 currently has its full bandwidth available to any requests. But since storage device 120 has allocated 30 MB/s to some stream, that portion of the bandwidth resource is not available for the host to request for a new stream.

In open stream request 325, host 105 may request that storage device 120 open a new stream. For purposes of identifying the stream, open stream request 325 may include a stream identifier. This stream identifier may be a tag that may be included with write requests, so that storage device 120 may quickly determine what stream the requests belong to. In embodiments of the inventive concept, the stream identifier may also be included in other requests, to help storage device 120 satisfy the QoS attributes of the stream for all requests (not just write requests). Storage device 120 may return a status of open stream request 325 as open stream response 330.

Once the stream has been opened, host 105 may configure storage device 120 with the stream's QoS settings. In configuration request 335, host 105 may specify the QoS attribute for the stream. The QoS attribute may be, for example, a minimum bandwidth to be allocated to the stream, a priority for the stream, or a maximum latency for requests from the stream. But regardless of the resource being allocated, host 105 may not request more of the resource than is currently unallocated. Put another way, the sum of all resource allocations across all streams may not exceed the capabilities of storage device 120. In configuration response 340, storage device 120 may return a status of configuration request 335.

In FIG. 3B, host 105 may send various requests, such as requests 345 and 350. Requests 345 and 350 may be write requests, read requests, or any other requests permitted by storage device 120. In response, storage device 120 may send responses 355 and 360, as appropriate to requests 345 and 355.

Host 105 may also send additional configuration requests, such as configuration request 365. Configuration request 365 may specify a new QoS attribute for the stream. That is, configuration request 365 may change the QoS attribute for the stream from what had been specified in configuration request 335 of FIG. 3A. Host 105 might change the QoS attribute for the stream for any number of reasons. For example, the original QoS attribute might allocate more resources than the stream actually needed, and configuration request 365 may release some excess resources. Or, the original QoS attribute might have been insufficient, and configuration request 365 may request additional resources. Or, the original QoS attribute might have been insufficient, but no additional resources were available at the time, but since then additional resources have been released, and configuration request 365 may request some (or all) of those additional resources be allocated to the stream. Configuration request 365 may also be used to return the stream to a default QoS attribute, as set by storage device 120 or as configured by host 105.

To obtain information about the unallocated resources of storage device 120, host 105 may also repeat unallocated resources request 315 of FIG. 3A (not shown in FIG. 3B) before sending configuration request 365, after which storage device 120 may send unallocated resources response 320 of FIG. 3A. Alternatively, host 105 may send configuration request 365 without repeating unallocated resource request 315 of FIG. 3A. For example, host 105 might skip repeating unallocated resource request 315 of FIG. 3A because host 105 is reducing the allocated resources associated with the stream, or because host 105 hopes the resources are available but does not want to check first. (If the resources are not available, configuration response 370 may indicate that configuration request 365 might not be satisfied.)

Regardless of the reason why host 105 sends configuration request 365, storage device 120 may send configuration response 370, returning a status of configuration request 365.

Note that FIG. 3B merely shows an example of the configuration and other requests that host 105 may send to storage device 120. Embodiments of the inventive concept may support any number of requests of any time, along with any number of configuration requests. In addition, the various requests may be ordered in any desired manner. For example, after host 105 sends configuration request 365, host 105 may send any additional number of write, read, or other requests. Host 105 may then send yet another configuration request to change the QoS attribute, and then more write, read, or other requests. And so on.

When the stream has been exhausted (that is, there are no further requests associated with the stream), host 105 may send close stream request 375. Storage device 120 may then close the stream and return close stream status 380. Closing the stream releases any resources allocated to the stream, permitting those resources to be used by other streams for QoS purposes.

As mentioned above with reference to FIG. 3A, in some embodiments of the inventive concept, storage device 120 may permit QoS attributes to be limited to a single resource or to a smaller set of agreed upon resources that all requesters need, shared by all streams. This implementation eliminates the problem of addressing the situation where different streams have different QoS attributes. For example, one stream might want a guaranteed minimum bandwidth, while another stream might want a guaranteed maximum latency. These different QoS attributes might be difficult to reconcile without somehow mapping one resource onto another (essentially making the resources all equivalent in some manner), and may be avoided by having storage device 120 limit QoS attributes to a single resource at a time.

But even in embodiments of the inventive concept where storage device 120 limits QoS attributes to a single resource, that fact does not mean that the resource in question may not be changed. For example, assume that only one stream is currently in use, which has a guaranteed minimum bandwidth for a QoS attribute. If that stream is closed, then there would be no streams with QoS attributes currently in place. A new stream might then be opened, specifying a QoS attribute of a guaranteed maximum latency. At this point, any subsequent streams may have to use latency as a QoS attribute, until that resource is no longer allocated to any streams.

In addition, if only one stream is currently using resources of storage device 120, host 105 may change what resource is used for QoS attribute purposes. For example, assume that only one stream has a QoS attribute, and that stream has specified a guaranteed minimum bandwidth. For whatever reason, host 105 wants to change the QoS attribute for that stream to a guaranteed maximum latency. Since changing the resource used for QoS attribute purposes would not affect any other streams with QoS attributes, host 105 might use configuration request 365 to change the QoS attribute of the stream from one resource to another. Thereafter, any new streams that would want to implement QoS attributes may have to use latency as the resource.

In FIGS. 3A-3B, example messages are shown. Different embodiments of the inventive concept may include other messages, some messages may be combined into a single message, or some messages may be broken down into multiple messages.

Figure 4:
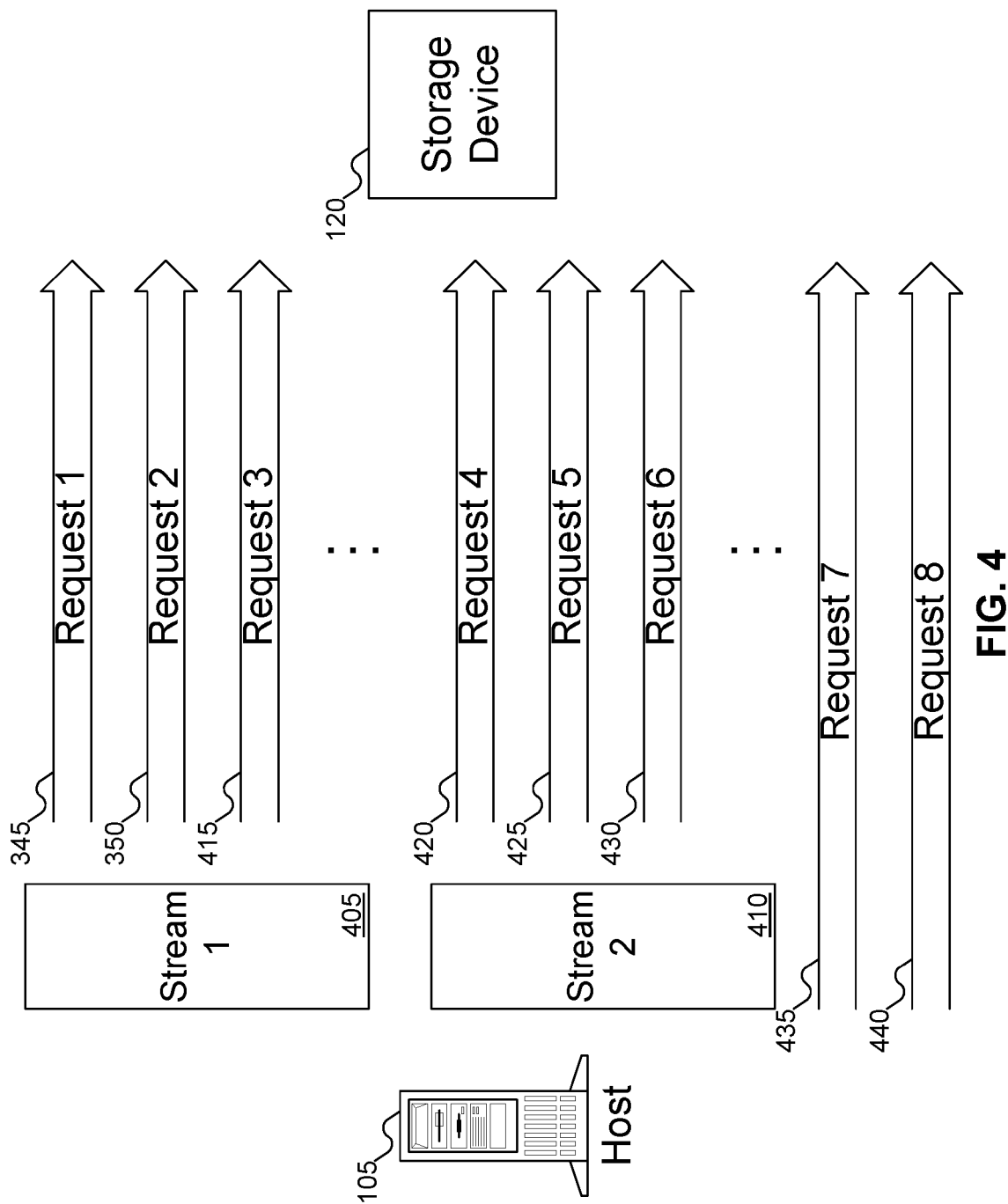
FIG. 4 shows the host of FIG. 1 sending various requests, some associated with streams and some not associated with streams, to the storage device of FIG. 1.

FIG. 4 shows host 105 of FIG. 1 sending various requests, some associated with streams and some not associated with streams, to storage device 120 of FIG. 1. In FIG. 4, host 105 is shown as having opened two streams 405 and 410. Requests 345, 350, and 415 are associated with stream 405 (for example, requests 345, 350, and 415 may include a tag with a stream identifier of stream 405), and requests 420, 425, and 430 are associated with stream 410. Finally, host 105 is shown as sending requests 435 and 440, which are not associated with any stream. This situation may arise if, for example, requests 435 and 440 originate from an application that sends so few requests to storage device 120 that there is no value in organizing those requests into a single stream, or if the data in question may not be grouped into streams in a meaningful way.

While FIG. 4 shows requests 345-440 in a specific order, embodiments of the inventive concept may support requests being sent in any order. In general, it is unlikely that host 105 would send requests to storage device 120 grouped by stream. It is more likely that requests would be generated in some mixed order.

Figure 5:
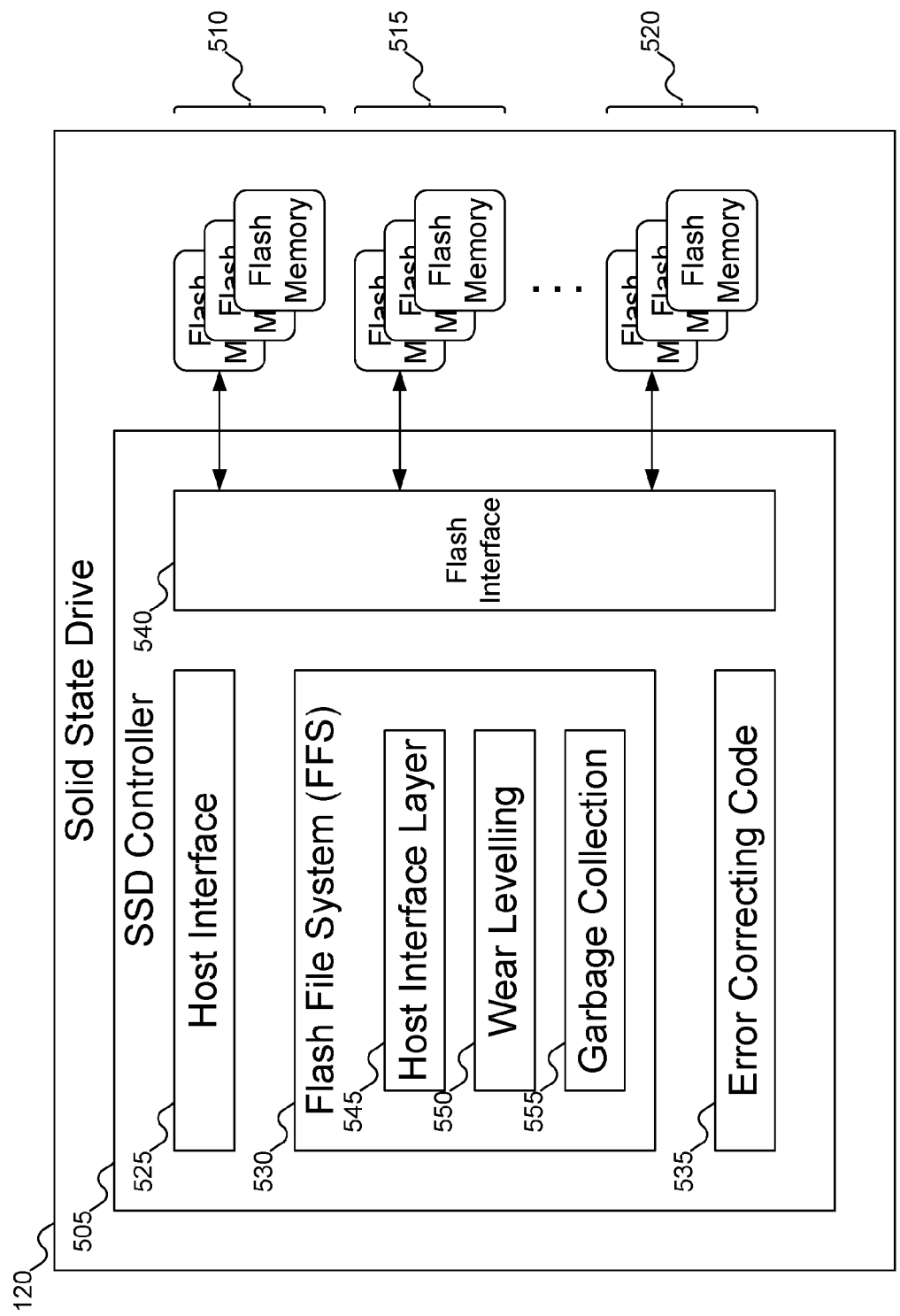
FIG. 5 shows details of the storage device of FIG. 1.

FIG. 5 shows details of storage device 120 of FIG. 1. In FIG. 5, storage device 120 is shown as an SSD, but as described above, any storage device that supports multi-streaming may be used instead. SSD 120 may include SSD controller 505 and flash memory 510, 515, and 520. SSD controller 505 may manage the operations of SSD 120. Flash memory 510, 515, and 520 may store data. Flash memory 510, 515, and 520 may be organized into channels, with each group of flash memory accessed via a separate channel.

While FIG. 5 shows three channels, each including three flash memory modules, embodiments of the inventive concept may support any number of channels, and any number of flash memory modules accessed via a channel.

SSD controller 505 may include host interface 525, flash file system 530, error correcting code 535, and flash interface 540. Host interface 525 may interface with host 105 of FIG. 1. Flash file system 530 may manage the file system used to store data in flash memory 510, 515, and 520. Error correcting code 535 may implement error correction codes with data stored in flash memory 510, 515, and 520. Flash interface 540 may manage accessing flash memory 510, 515, and 520, to perform read, write, or other requests involving data stored in flash memory 510, 515, and 520.

Flash file system 530 may include host interface layer 545, wear leveling 550, and garbage collection 555. Host interface layer 545 may manage information as received from host 105 of FIG. 1 via host interface 525: host interface layer 545 is discussed further with reference to FIG. 6 below. Wear leveling 550 recognizes that flash memory cells may process a finite and relatively predictable number of write operations before flash memory 510, 515, and 520 begins to fail, and may move data around in flash memory 510, 515, and 520 to keep the number of writes to each cell relatively uniform. Garbage collection 555 recognizes that flash memory cells may not be overwritten: data needs to be invalidated. Eventually, invalid cells (usually organized in groups called blocks or superblocks) are flagged to be freed by garbage collection 555.

Figure 6:
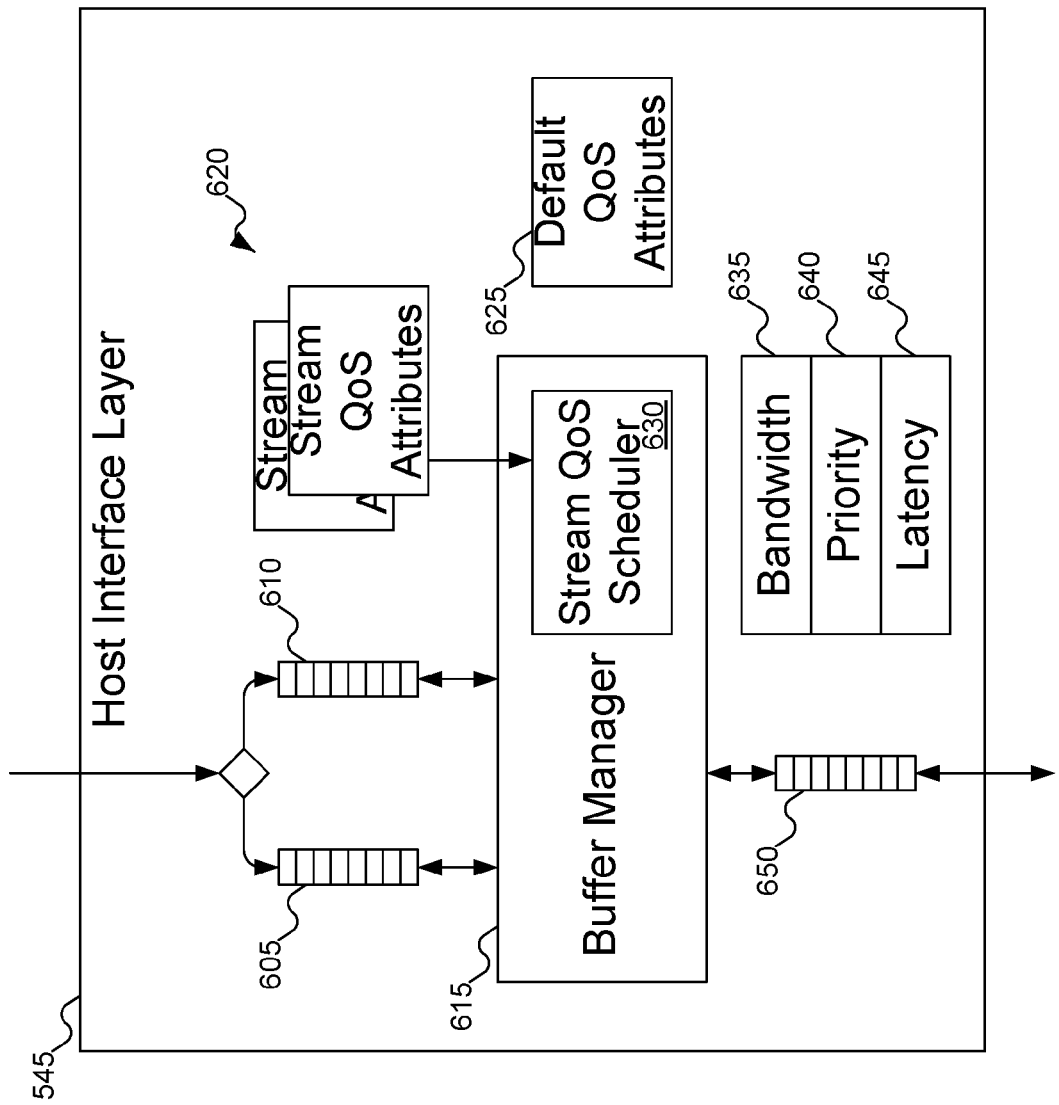
FIG. 6 shows details of the host interface layer of FIG. 5.

FIG. 6 shows details of the host interface layer of FIG. 5. In FIG. 6, host interface layer 545 may include queues 605 and 610. Queue 605 may be a regular request queue, used to store requests not associated with a stream; queue 610 may be a stream request queue, used to store requests that are associated with a stream. Queues 605 and 610 may feed into buffer manager 615 which may determine the order in which requests are satisfied. Note that requests might not be satisfied in the order in which they arrive at SSD 120 of FIG. 5, as requests associated with a stream with a QoS attribute might need to be satisfied before requests that do not have an associated QoS attribute.

In some embodiments of the inventive concept, regular request queue 605 may store requests that are not associated with a QoS attribute. These requests may be either requests that have no associated stream (that is, requests that are not tagged with a stream ID), or requests associated with a stream that itself does not have a QoS attribute. For example, FIG. 6 shows two Stream QoS attributes 620, representing the QoS attributes for two streams. If there is also a third stream sending requests to SSD 120 of FIG. 5, then that stream would have no QoS attribute. (While FIG. 6 shows only two stream QoS attributes 620, embodiments of the inventive concept may support any number of stream QoS attributes for any number of streams.)

But in other embodiments of the inventive concept, a stream that does not explicitly have a QoS attribute may have default QoS attribute 625 applied. For example, requests associated with a stream, even without an explicit QoS attribute, might be considered to have a higher priority than non-stream requests that do not have an associated QoS attribute. In these embodiments of the inventive concept, regular request queue 605 would only store requests that are not associated with a stream, as the default QoS attribute would apply and those requests would be stored in stream request queue 610.

As mentioned above, once requests have been stored in either regular request queue 605 or stream request queue 610, buffer manager 615 may determine the overall order in which requests are processed. To that end, stream QoS scheduler 630 may schedule requests from both regular request queue 605 and stream request queue 610 to satisfy stream QoS attributes 620 for the streams (and to satisfy default QoS attributes 625 for streams that do not explicitly establish QoS attributes). QoS scheduler 630 may use any desired scheduling algorithm to satisfy stream QoS attributes 620, such as weighted fair queueing. QoS scheduler 630 may use different scheduling algorithms, depending on the resources being used in stream QoS attributes 620. For example, QoS scheduler 630 may use one scheduling algorithm when bandwidth 635 (using minimum bandwidth allocations, maximum bandwidth allocations, or a mixture of the two) is the resource in question, another scheduling algorithm when priority 640 is the resource, and a third scheduling algorithm when latency 645 is the resource.

Regardless of the particular scheduling algorithm used, once the requests have been ordered, the requests may be stored in event queue 650. Requests may then be taken out of event queue 650 by flash interface 540 of FIG. 5 and processed using flash memory 510, 515, and 520 of FIG. 5.

Figure 7:
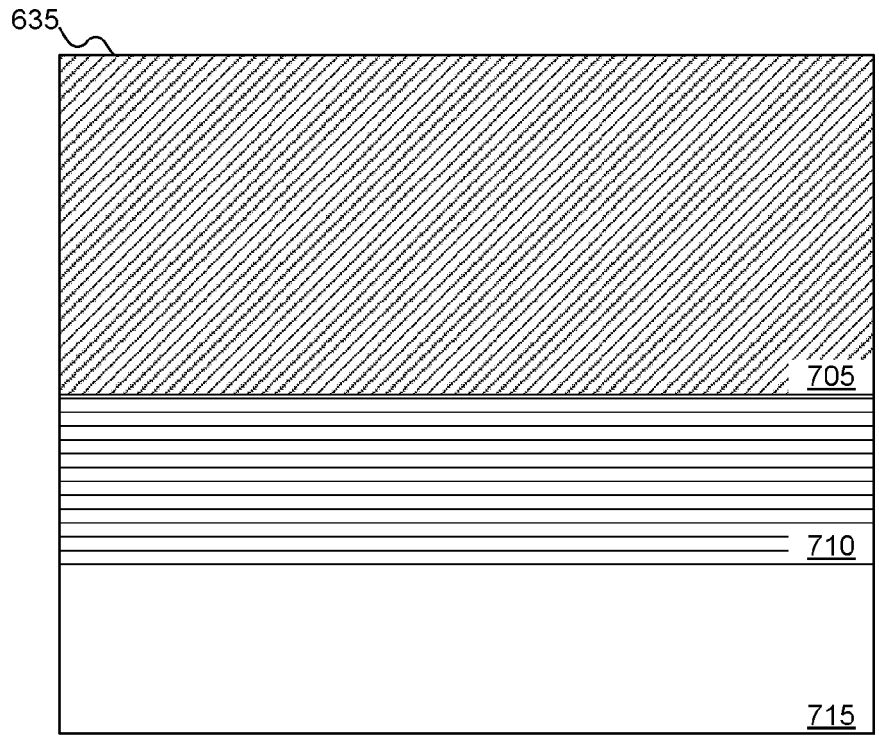
FIG. 7 shows bandwidth of the storage device of FIG. 1 being allocated to streams, according to an embodiment of the inventive concept.

FIG. 7 shows bandwidth 635 of FIG. 6 of storage device 120 of FIG. 1 being allocated to streams, according to an embodiment of the inventive concept. Conventional multi-stream storage devices do not support bandwidth allocation to streams. As an example of how bandwidth 635 may be allocated as a resource, assume that storage device 120 of FIG. 1 has a total steady state performance of 100 MB/s. If one stream has a burst of requests, that stream might use up the entire 100 MB/s bandwidth. If there are equal or higher priority requests from other streams, those streams QoS may suffer. With bandwidth allocation, host 105 of FIG. 1 may set the minimum bandwidth limit of 50 MB/s for stream 1, as shown by portion 705. By allocating portion 705 of bandwidth 635, storage device 120 of FIG. 1 may guarantee that the QoS attribute for that stream is satisfied, but leaving additional bandwidth resources available for other streams. Alternatively, host 105 of FIG. 1 may set a maximum bandwidth for a stream, preventing that stream from using more than a predetermined amount of the overall bandwidth available from storage device 120 of FIG. 1. In other embodiments of the inventive concept, host 105 of FIG. 1 may set minimum bandwidths for some streams and maximum bandwidths for other streams, mixing the settings as desired.

If a second stream then requests an additional 25 MB/s of bandwidth 635, host interface layer 545 of FIG. 5 may allocate portion 710 of bandwidth 635 to that stream. After this allocation, 25 MB/s of bandwidth 635, shown as portion 715, may remain for use with other requests.

Given the stream QoS attributes that allocate portions 705 and 710 of bandwidth 635, stream QoS scheduler 630 of FIG. 6 may schedule requests to satisfy these QoS attributes. For example, assuming there are enough requests to keep storage device 120 occupied full-time, QoS scheduler 630 of FIG. 6 may select ½ of the requests from the first stream and ¼ of the requests from the second stream, and may then satisfy all other requests in the order in which they arrive. For example, stream QoS scheduler 630 of FIG. 6 may schedule requests in the following order, where the numbers represent streams (1 and 2) or other, non-stream requests (other numbers): 1 1 2 3 1 1 2 4 1 1 2 5 and so on. (In actuality, this description reflect more providing a specified number of input/output operations per second (IOPS) than providing a specified bandwidth, since each request might involve a different amount of data. But if each request were assumed to involve the same amount of data, then IOPS would be equivalent to bandwidth.) Stream QoS scheduler 630 of FIG. 6 may schedule the requests using any desired scheduling algorithm to satisfy the streams' QoS attributes.

Figure 8:
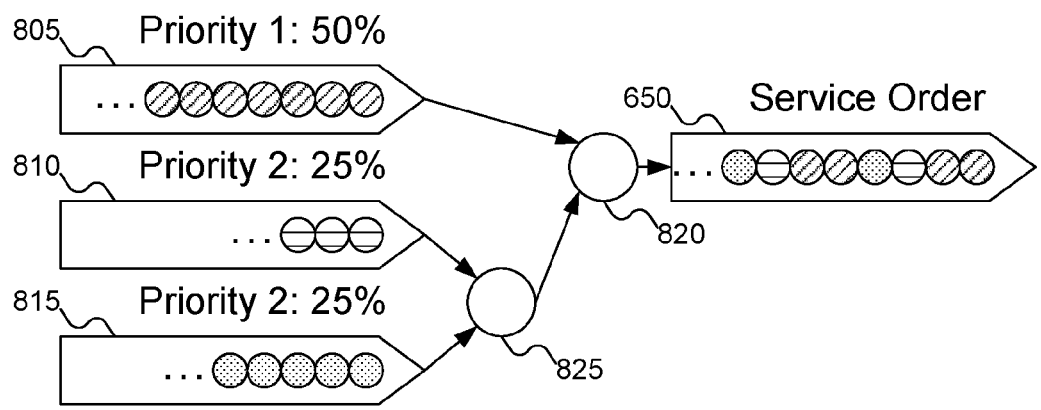
FIG. 8 shows priority of the storage device of FIG. 1 being allocated to streams, according to an embodiment of the inventive concept.

FIG. 8 shows priority 640 of FIG. 6 of storage device 120 of FIG. 1 being allocated to streams, according to an embodiment of the inventive concept. Conventional multi-stream storage devices do not support priority assignments for streams. But if a low priority stream has already queued a number of requests, whether read, write, or other requests, for processing by storage device 120 of FIG. 1 and then requests from a high priority stream arrive, those high priority stream requests may have to wait, resulting in a poor QoS for the high priority stream.

By assigning a priority level for each stream, stream QoS scheduler 630 of FIG. 6 may service the high priority stream requests first. But embodiments of the inventive concept may also avoid starving low priority stream requests when a higher priority stream is continually issuing commands. Fair weighted queueing is an example scheduling algorithm that may avoid the low priority stream requests being starved, but embodiments of the inventive concept may use any desired scheduling algorithm that prioritizes the higher priority stream.

In FIG. 8, three streams 805, 810, and 815 are shown. Stream 805 may have a priority level of 1; streams 810 and 815 may have a priority level of 2 (which is a lower priority). To reflect the higher priority of stream 805, requests may be taken from stream 805 at double the rate of streams 810 and 815 (reflected by the percentages shown). When the requests are scheduled in event queue 650, the request order may favor requests from stream 805, but still satisfy requests from streams 810 and 815. Thus, the request order may be, for example, 1 1 2 3 1 1 2 3, and so on, where the numbers represent the streams from which the requests are scheduled.

Note that FIG. 8 represents one way to achieve the representative stream priorities: other stream priorities may be achieved using different approaches. Selector node 820 may choose either stream 805 or selector node 825 with equal chance. If selector node 825 is chosen, selector node 825 may then choose between streams 810 and 815 with equal chance. Stringing together a series of these selector nodes and modifying the selection chances may result in very fine grained control for any number of priority levels with any related probabilities.

Figure 9:
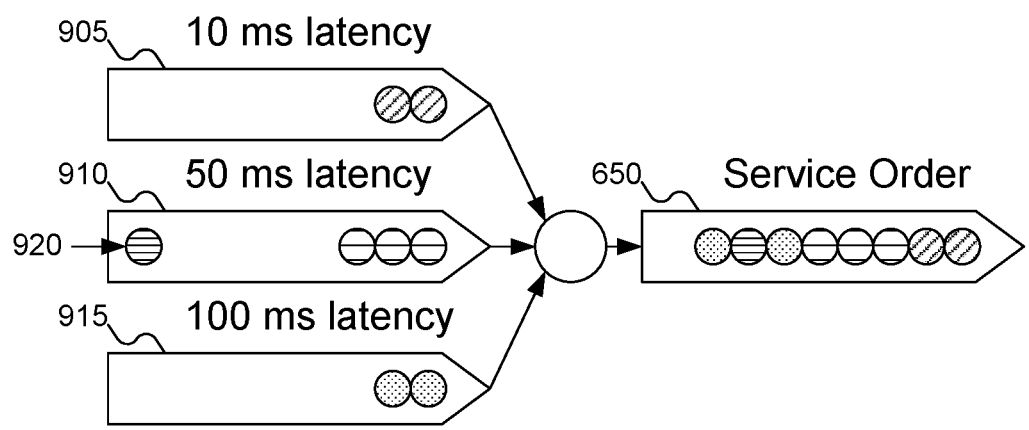
FIG. 9 shows latency of the storage device of FIG. 1 being allocated to streams, according to an embodiment of the inventive concept.

FIG. 9 shows latency 645 of FIG. 6 of storage device 120 of FIG. 1 being allocated to streams, according to an embodiment of the inventive concept. Conventional multi-stream storage devices do not support guaranteeing latency for streams. If a stream demands servicing requests within a certain time period (for example, real-time response), storage device 120 of FIG. 1 may use latency 645 when streams are configured with priority level 0. This priority level 0 latency setting enables storage device 120 of FIG. 1 to better prioritize requests in a more deterministic manner. With the objective being to ensure that requests are satisfied no later than the specified latency, stream QoS scheduler 630 of FIG. 6 may use any desired scheduling algorithm to satisfy the desired latency for the requests.

For example, in FIG. 9, three different streams 905, 910, and 915 are shown. Stream 905 may have a latency of 10 milliseconds (ms) (that is, stream 905 may specify that all requests should be satisfied in no more than 10 ms), stream 910 may have a latency of 50 ms, and stream 915 may have a latency of 100 ms. Because stream 915 only expects a response within 100 ms, stream QoS scheduler 630 of FIG. 6 may schedule requests from streams 905 and 910 before requests from stream 915 need to be processed. For example, event queue shows two requests from stream 905 and three requests from stream 910 being scheduled before any request from stream 915 is scheduled.

Now consider the situation where stream 910 issues new request 920. With various requests waiting to be processed, processing the requests in the order in which they arrived might not satisfy the stream QoS attributes. For example, if request 920 is processed after the requests from stream 915 are processed, request 920 might end up with a total latency greater than 50 ms. To ensure that all the stream QoS attributes are satisfied, stream QoS scheduler 630 of FIG. 6 may evaluate the expiration of the pending requests and insert the new request into event queue 650 accordingly.

Figure 10A:
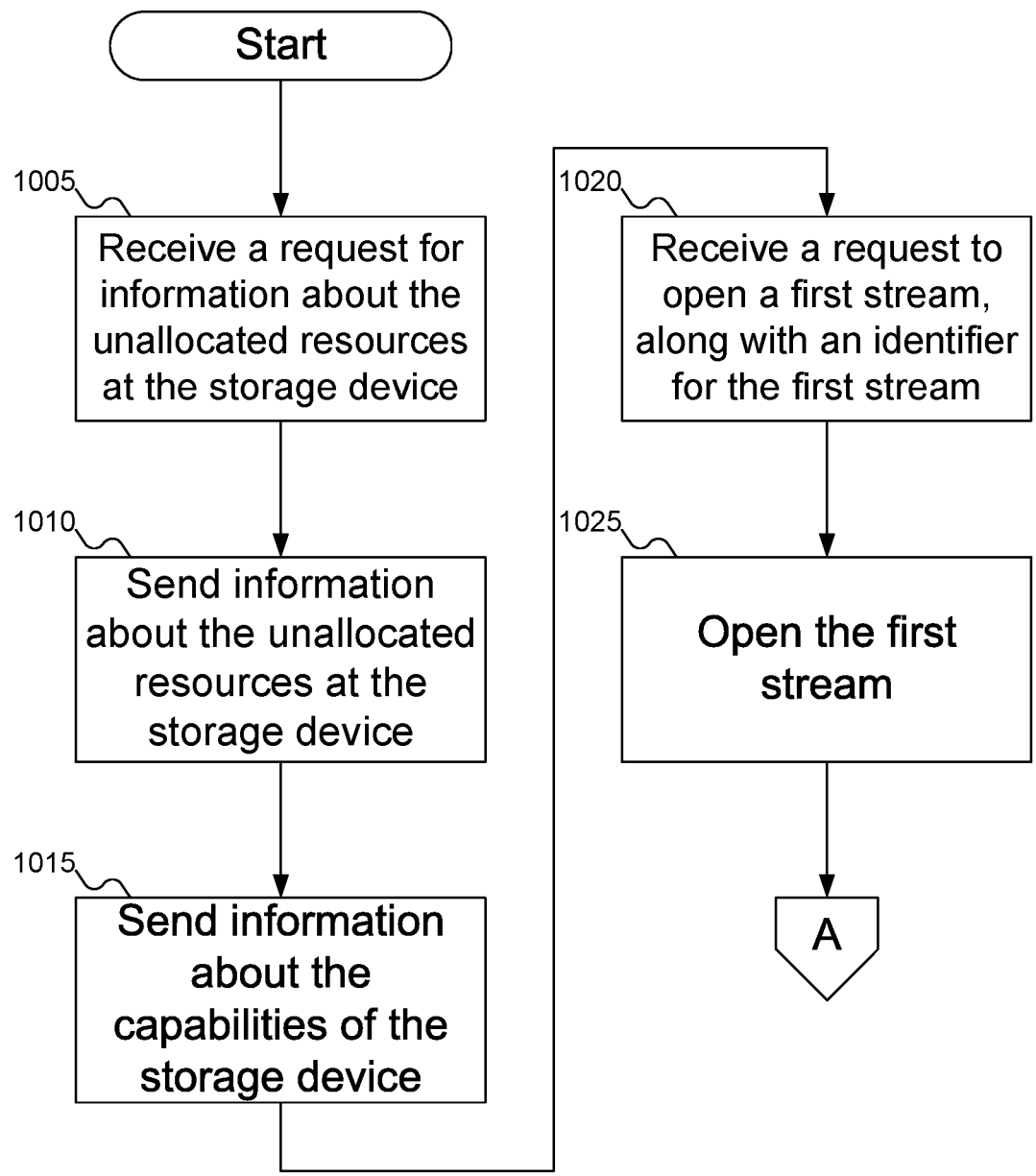
FIGS. 10A-10B show a flowchart of an example procedure for the storage device of FIG. 1 to process requests and satisfy a Quality of Service (QoS) attribute for a stream, according to an embodiment of the inventive concept.
Figure 10B:
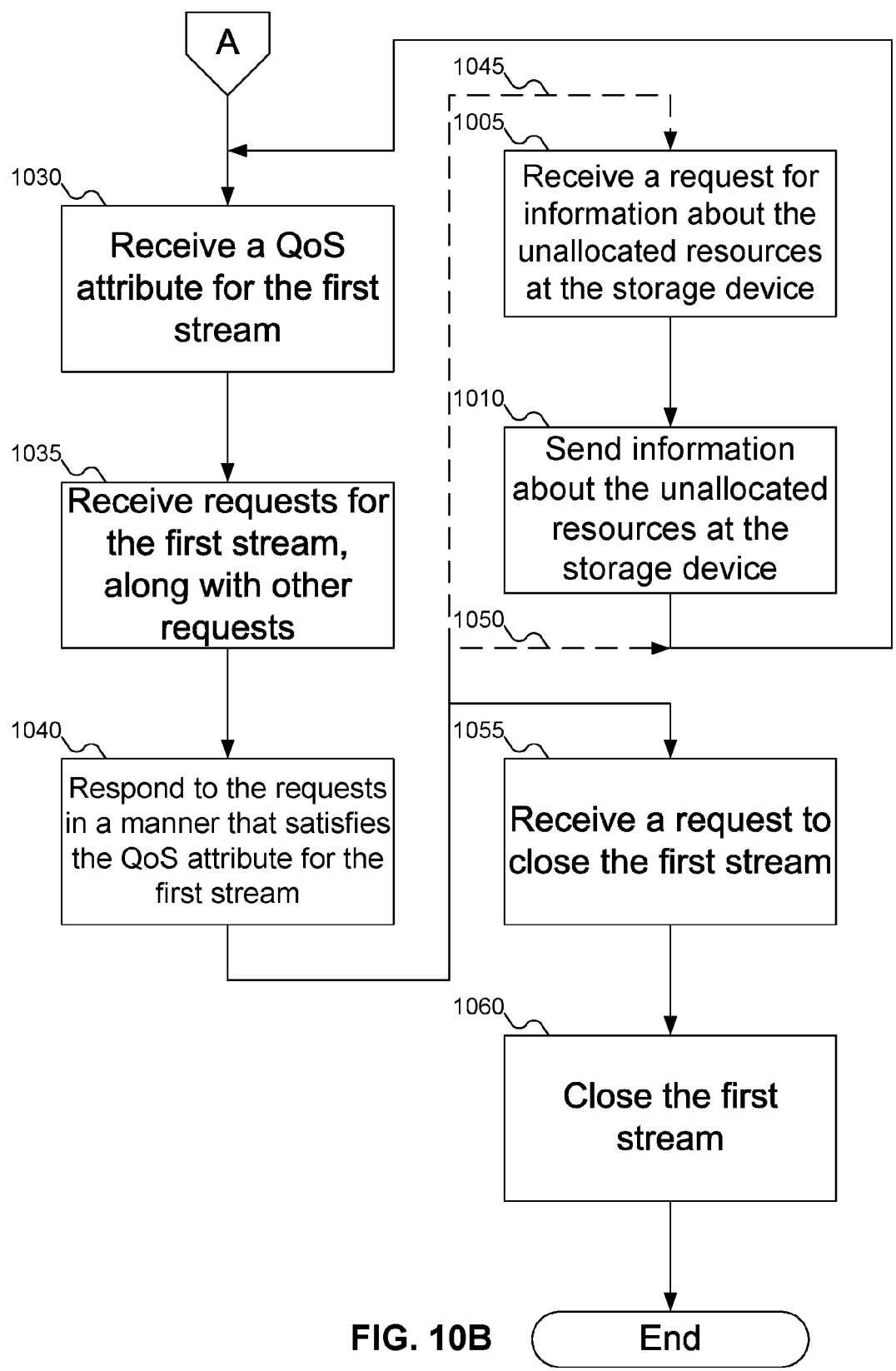

FIGS. 10A-10B show a flowchart of an example procedure for storage device 120 of FIG. 1 to process requests and satisfy a Quality of Service (QoS) attribute for a stream, according to an embodiment of the inventive concept. In FIG. 10A, at block 1005, host 105 of FIG. 1 may send unallocated resources request 315 of FIG. 3A to storage device 120 of FIG. 1, requesting information about the unallocated resources of storage device 120 of FIG. 1. At block 1010, storage device 120 of FIG. 1 may send unallocated resources response 320 of FIG. 3A to host 105 of FIG. 1, providing information about the unallocated resources of storage device 120 of FIG. 1. At block 1015, storage device 120 of FIG. 1 may send capabilities response 310 of FIG. 3A to host 105 of FIG. 1, providing information about the capabilities of storage device 120 of FIG. 1. Note that in contrast to FIG. 3A, in block 1015 of FIG. 10A storage device 120 of FIG. 1 may send capabilities response 310 of FIG. 3A to host 105 of FIG. 1 without host 105 of FIG. 1 sending capabilities request 305 of FIG. 3A.

At block 1020, host 105 of FIG. 1 may send open stream request 325 of FIG. 3A to storage device 120 of FIG. 1. At block 1025, storage device 120 of FIG. 1 may open the stream and send open stream response 330 of FIG. 3A.

At block 1030 (FIG. 10B), host 105 of FIG. 1 may send configuration request 335 of FIG. 3A to storage device 120 of FIG. 1, specifying a stream QoS attribute for the stream. At block 1035, host 105 of FIG. 1 may send requests to storage device 120 of FIG. 1. These requests may be associated with the stream, or they may be requests that are not associated with any stream. At block 1040, storage device 120 of FIG. 1 may process the requests in a manner that satisfies the stream QoS attributes.

At this point, as shown by dashed arrows 1045 and 1050, various possibilities may occur. In some embodiments of the inventive concept, processing may continue with block 1055, where host 105 of FIG. 1 may send close stream request 375 to storage device 120 of FIG. 1, after which at block 1060 storage device 120 of FIG. 1 may close the stream. In other embodiments of the inventive concept, as shown by dashed line 1045, host 105 of FIG. 1 may change the QoS attributes for the stream by repeating blocks 1005 and 1010 to determine what unallocated resources exist on storage device 120 of FIG. 1, then returning to block 1030 to send a second configuration request 335 of FIG. 3A to storage device 120 of FIG. 1. As described above, host 105 of FIG. 1 might reset the stream's QoS attributes to the default QoS attributes, change the resource allocation for the stream, or change from one resource to another (if no other stream has specified any QoS attributes). In yet other embodiments of the inventive concept, as shown by dashed arrow 1050, host 105 of FIG. 1 may proceed directly to block 1030 to issue a second configuration request 335 of FIG. 3A, without first determining the currently unallocated resources of storage device 120.

Figure 11A:
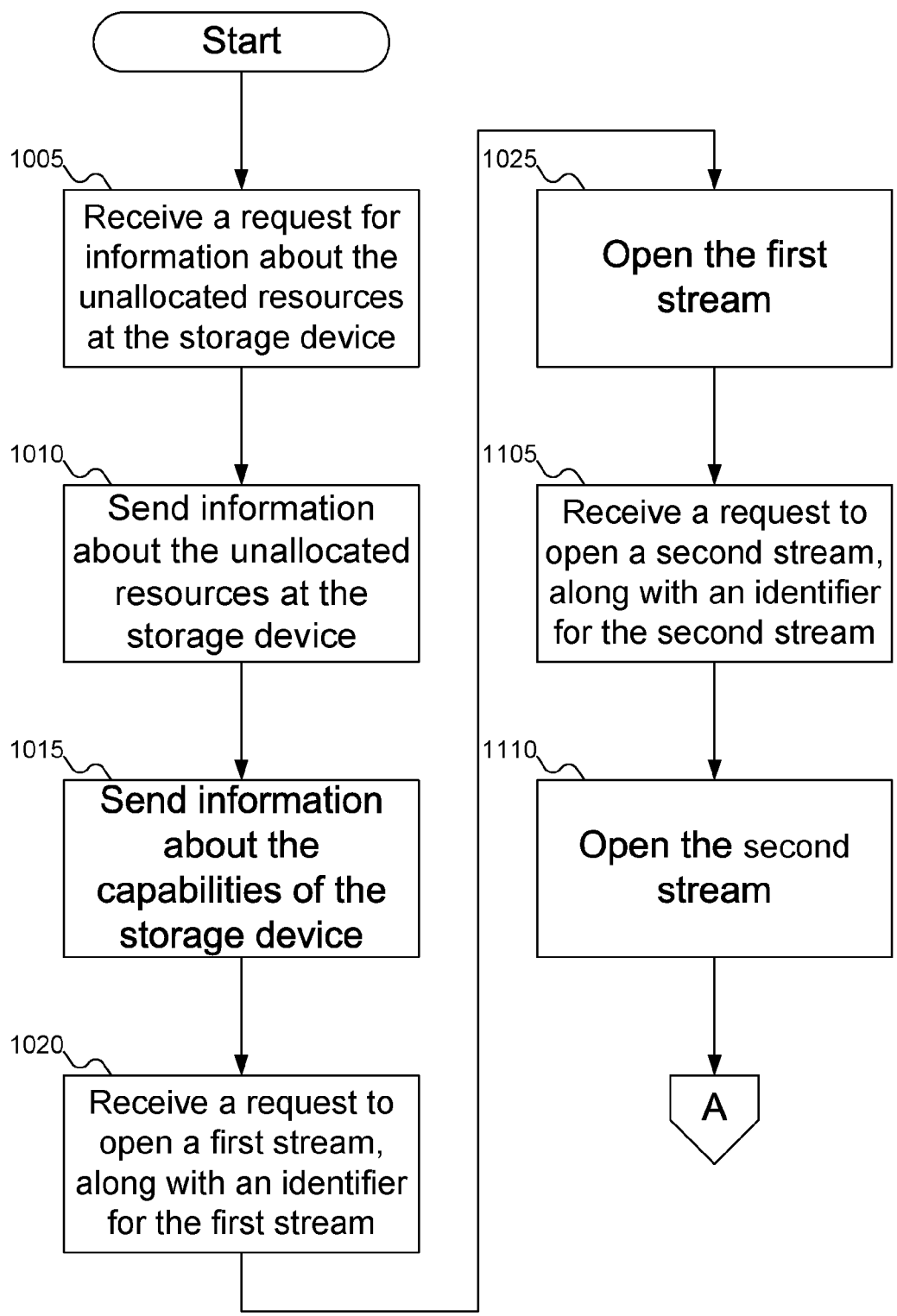
FIGS. 11A-11B show a flowchart of an example procedure for the storage device of FIG. 1 to process requests and satisfy Quality of Service (QoS) attributes for multiple streams, according to an embodiment of the inventive concept.
Figure 11B:
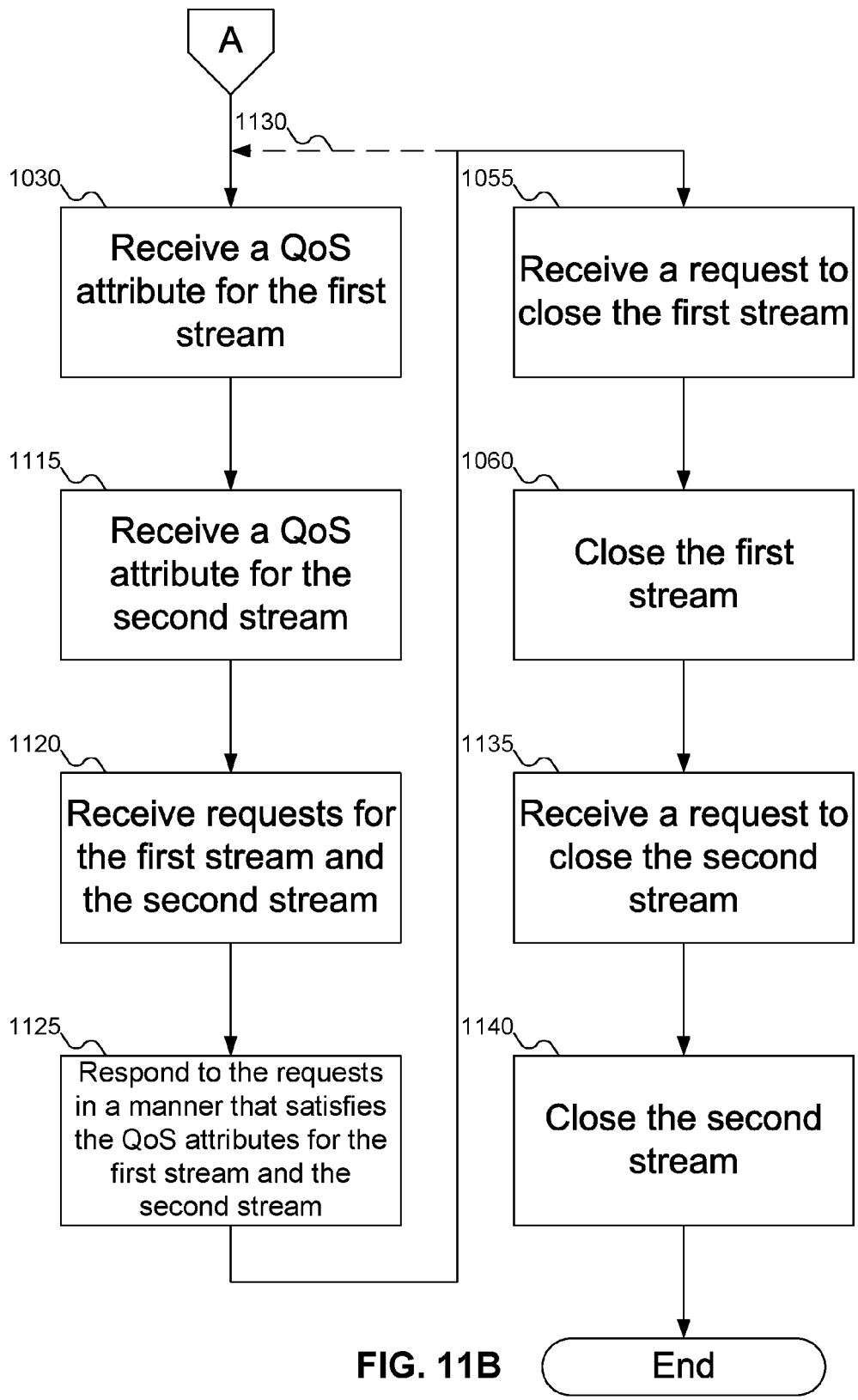

In FIGS. 10A-10B, only one stream is described. But embodiments of the inventive concept may support any number of streams being open. FIGS. 11A-11B show a flowchart of an example procedure for storage device 120 of FIG. 1 to process requests and satisfy Quality of Service (QoS) attributes for multiple streams, according to an embodiment of the inventive concept. Where blocks are unchanged between FIGS. 10A-10B and 11A-11B, the same reference numbers are re-used.

In FIG. 11A, at block 1005, host 105 of FIG. 1 may send unallocated resources request 315 of FIG. 3A to storage device 120 of FIG. 1, requesting information about the unallocated resources of storage device 120 of FIG. 1. At block 1010, storage device 120 of FIG. 1 may send unallocated resources response 320 of FIG. 3A to host 105 of FIG. 1, providing information about the unallocated resources of storage device 120 of FIG. 1. At block 1015, storage device 120 of FIG. 1 may send capabilities response 310 of FIG. 3A to host 105 of FIG. 1, providing information about the capabilities of storage device 120 of FIG. 1. Note that in contrast to FIG. 3A, in block 1015 of FIG. 11A storage device 120 of FIG. 1 may send capabilities response 310 of FIG. 3A to host 105 of FIG. 1 without host 105 of FIG. 1 sending capabilities request 305 of FIG. 3A. This possibility may also occur in other embodiments of the inventive concept.

At block 1020, host 105 of FIG. 1 may send open stream request 325 of FIG. 3A to storage device 120 of FIG. 1. At block 1025, storage device 120 of FIG. 1 may open the first stream and send open stream response 330 of FIG. 3A. At block 1105, host 105 of FIG. 1 may send a second open stream request 325 of FIG. 3A to storage device 120 of FIG. 1, to open a second stream. At block 1110, storage device 120 of FIG. 1 may open the second stream and send open stream response 330 of FIG. 3A.

At block 1030 (FIG. 11B), host 105 of FIG. 1 may send configuration request 335 of FIG. 3A to storage device 120 of FIG. 1, specifying a stream QoS attribute for the first stream. At block 1115, host 105 of FIG. 1 may send configuration request 335 of FIG. 3A to storage device 120 of FIG. 1, specifying a stream QoS attribute for the second stream. At block 1120, host 105 of FIG. 1 may send requests to storage device 120 of FIG. 1. These requests may be associated with the first and/or second streams, or they may be requests that are not associated with any stream. At block 1125, storage device 120 of FIG. 1 may process the requests in a manner that satisfies the streams' QoS attributes.

At this point, as shown by dashed arrow 1130, processing may return to block 1030, permitting host 105 of FIG. 1 to change one or more of the streams' QoS attributes, after which host 105 of FIG. 1 may send further requests. As described above, host 105 of FIG. 1 might reset the streams' QoS attributes to the default QoS attributes, change the resource allocation for the stream, or change from one resource to another (if no other stream has specified any QoS attributes). (As compared with FIG. 10B, for variation FIG. 11B does not show blocks 1005 and 1010 being repeated, but embodiments of the inventive concept may include blocks 1005 and 1010 between blocks 1125 and 1030, similar to FIG. 10B.) Alternatively, processing may continue with block 1055, where host 105 of FIG. 1 may send close stream request 375 to storage device 120 of FIG. 1, after which at block 1060 storage device 120 of FIG. 1 may close the first stream. Then, at block 1135, host 105 of FIG. 1 may send second close stream request 375 to storage device 120 of FIG. 1 to, after which at block 1140 storage device 120 of FIG. 1 may close the second stream.

Figure 12:
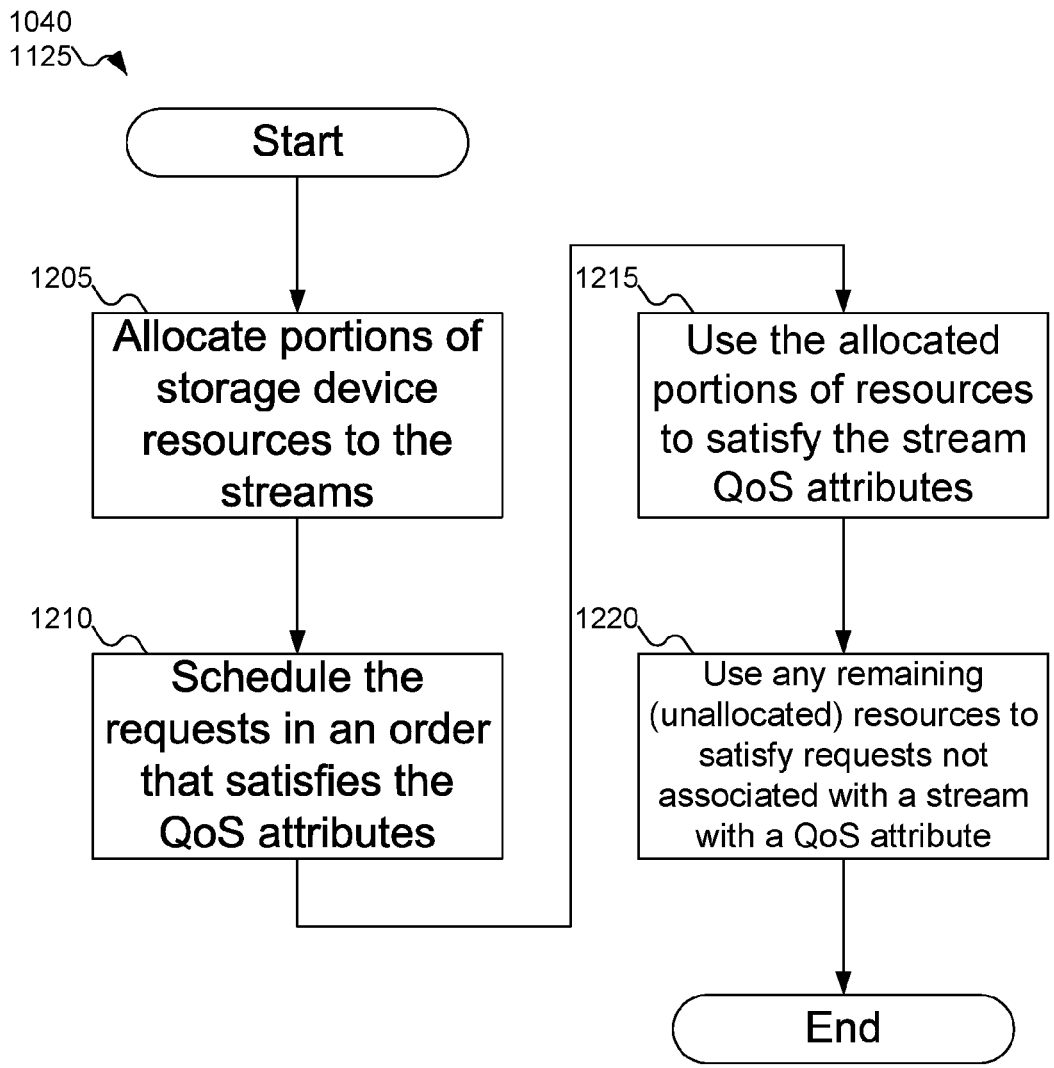
FIG. 12 shows a flowchart of an example procedure for the storage device of FIG. 1 to allocate resources to streams, according to an embodiment of the inventive concept.

FIG. 12 shows a flowchart of an example procedure for storage device 120 of FIG. 1 to allocate resources to streams, according to an embodiment of the inventive concept. In FIG. 12, at block 1205, storage device 120 of FIG. 1 may allocate a portion of the resources of storage device 120 of FIG. 1 to the stream(s). At block 1210, stream QoS scheduler 630 of FIG. 6 (as part of buffer manager 615 of FIG. 6) may schedule requests received from host 105 of FIG. 1, via queues 605 and 610 of FIG. 6, in an order that satisfies the stream QoS attributes. At block 1215, storage device 120 of FIG. 1 may use the allocated resources of storage device 120 of FIG. 1 to satisfy the requests for the stream. Finally, at block 1220, storage device 120 of FIG. 1 may use any remaining, unallocated resources to satisfy requests not associated with the stream.

Figure 13A:
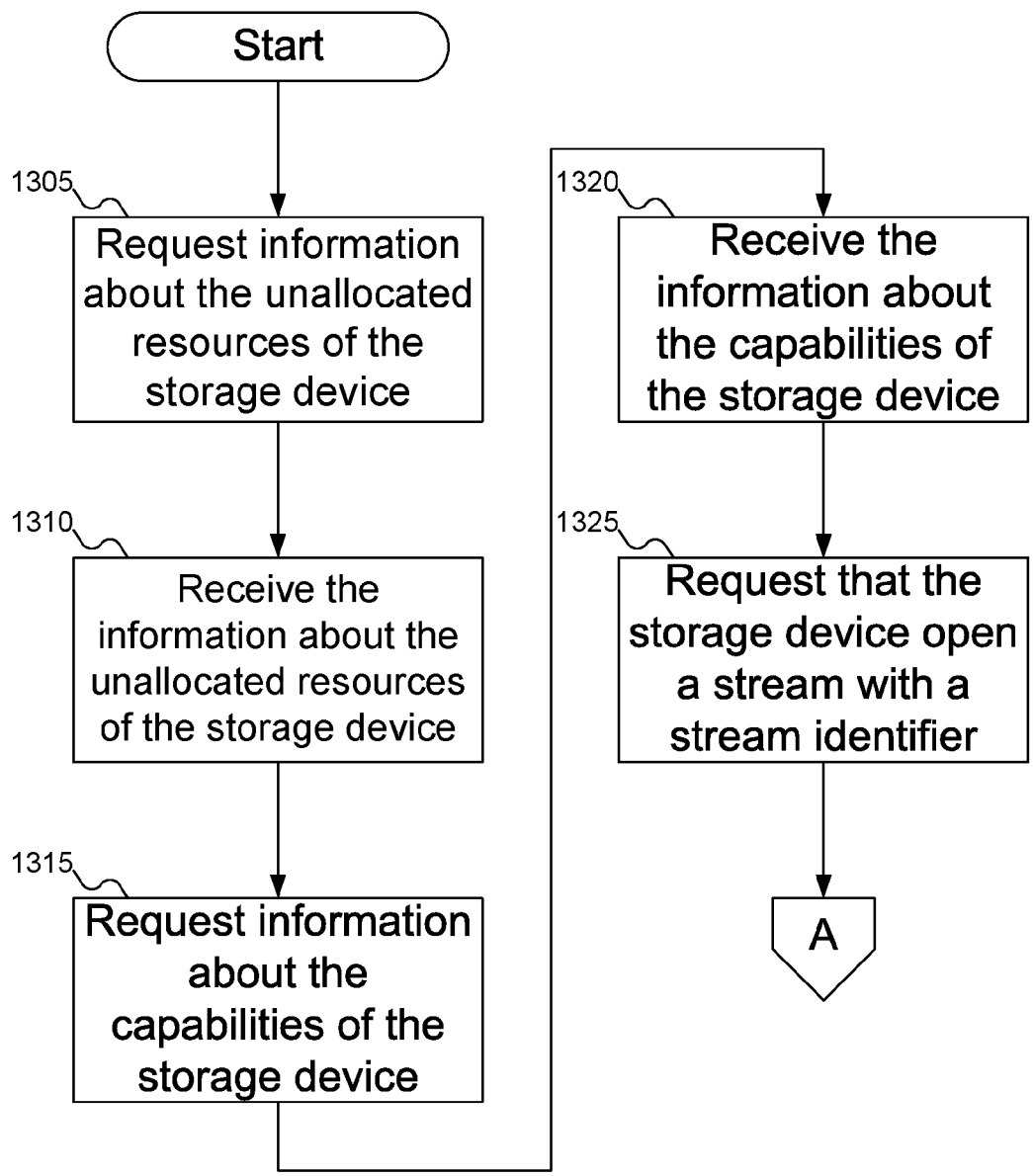
FIGS. 13A-13B show a flowchart of a procedure for the host of FIG. 1 to establish QoS attributes for a stream with the storage device of FIG. 1, according to an embodiment of the inventive concept.
Figure 13B:
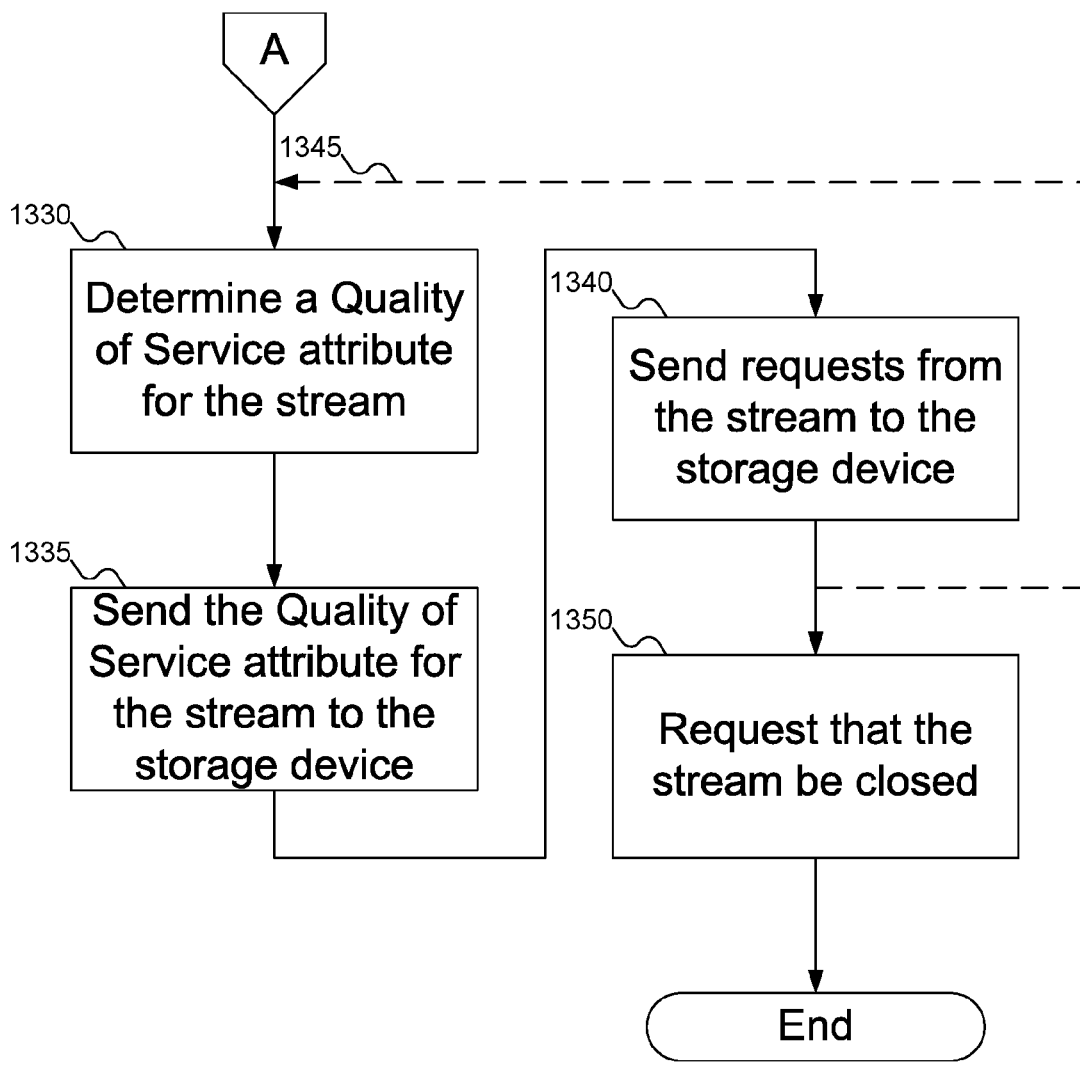

FIGS. 13A-13B show a flowchart of a procedure for host 105 of FIG. 1 to establish QoS attributes for a stream with storage device 120 of FIG. 1, according to an embodiment of the inventive concept. In contrast to FIGS. 10A-10B and 11A-11B, which show a flowchart from the perspective of storage device 120 of FIG. 1, FIGS. 13A-13B show a flowchart form the perspective of host 105 of FIG. 1.

In FIG. 13A, at block 1305, host 105 of FIG. 1 may send unallocated resources request 315 of FIG. 3A to storage device 120 of FIG. 1. At block 1310, storage device 120 of FIG. 1 may send unallocated resources response 320 of FIG. 3A to host 105 of FIG. 1. At block 1315, host 105 of FIG. 1 may send capabilities request 305 of FIG. 3A to storage device 120 of FIG. 1. At block 1320, storage device 120 of FIG. 1 may send capabilities response 310 of FIG. 3A to host 105 of FIG. 1. At block 1325, host 105 may send open stream request 325 of FIG. 3A to storage device 120 of FIG. 1.

At block 1330 (FIG. 13B), host 105 of FIG. 1 may determine a desired stream QoS attribute. At block 1335, host 105 of FIG. 1 may send configuration request 335 of FIG. 3A to storage device 120 of FIG. 1. At block 1340, host 105 of FIG. 1 may send requests 345 and 350 of FIG. 3B to storage device 120 of FIG. 1.

At this point, as shown by dashed line 1345, processing may return to block 1330 for host 105 of FIG. 1 to change the stream QoS attributes, followed by sending new requests. Alternatively, at block 1350, host 105 may send close stream request 375 of FIG. 3B to storage device 120 of FIG. 1, to close the stream.

In FIGS. 10A-13B, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a storage device (120), comprising:
memory (510, 515, 520) on the storage device (120) to store data;
a host interface (525) to receive first requests (345, 350, 415) for a first stream (405) and second requests (420, 425, 430, 435, 440) from a host (105); and
a host interface layer (545) to schedule the first requests (345, 350, 415) and second requests (420, 425, 430, 435, 440) in a manner that may satisfy a first Quality of Service (QoS) attribute (620) for the first stream (405).

Statement 2. An embodiment of the inventive concept includes a storage device (120) according to statement 1, wherein the storage device (120) includes a Solid State Drive (SSD) (120).

Statement 3. An embodiment of the inventive concept includes a storage device (120) according to statement 1, wherein:
the host interface (525) is operative to receive the first requests (345, 350, 415) for the first stream (405) and the second requests (420, 425, 430) for a second stream (410) from the host (105); and
the host interface layer (545) is operative to schedule the first requests (345, 350, 415) and second requests (420, 425, 430) in a manner that may satisfy the first QoS attribute (620) for the first stream (405) and a second QoS attribute (620) for the second stream (410).

Statement 4. An embodiment of the inventive concept includes a storage device (120) according to statement 3, wherein the host interface layer (545) is operative to allocate a first portion (705) of resources (635, 640, 645) of the storage device (120) to process the first requests (345, 350, 415) for the first stream (405) and a second portion (710) of the resources (635, 640, 645) of the storage device (120) to process the second requests (420, 425, 430) for the second stream (410).

Statement 5. An embodiment of the inventive concept includes a storage device (120) according to statement 4, wherein the host interface layer (545) is further operative to allocate a third portion of the resources (635, 640, 645) of the storage device (120) to process third requests (435, 440) from the host (105).

Statement 6. An embodiment of the inventive concept includes a storage device (120) according to statement 1, wherein the host interface layer (545) is operative to allocate a first portion (705) of resources (635, 640, 645) of the storage device (120) to process the first requests (345, 350, 415) for the first stream (405) and a second portion (710) of the resources (635, 640, 645) of the storage device (120) to process the second requests (420, 425, 430, 435, 440).

Statement 7. An embodiment of the inventive concept includes a storage device (120) according to statement 1, wherein the QoS attribute (620) is drawn from a set including a minimum bandwidth (635), a maximum bandwidth (635), a priority (640), and a maximum latency (645).

Statement 8. An embodiment of the inventive concept includes a storage device (120) according to statement 1, wherein the host interface layer (545) includes:
a stream request queue (610) and a regular request queue (605); and
a stream QoS scheduler (630) to schedule the first requests (345, 350, 415) from the stream request queue (610) and the second requests (420, 425, 430, 435, 440) from the regular request queue (605) while satisfying a first Quality of Service (QoS) attribute (620) for the first stream (405).

Statement 9. An embodiment of the inventive concept includes a storage device (120) according to statement 8, wherein the stream QoS scheduler (630) includes a weighted fair queueing scheduler.

Statement 10. An embodiment of the inventive concept includes a method, comprising: receiving (1020) an identifier for a first stream (405) from a host (105) at a storage device (120), the identifier for the first stream (405) identifying a first stream (405);
receiving (1030) a first Quality of Service (QoS) attribute (620) for the first stream (405) from the host (105) at the storage device (120); and
responding (1040) to first requests (345, 350, 415) for the first stream (405) and second requests (420, 425, 430, 435, 440) at the storage device (120) in a manner that satisfies the first QoS attribute (620) for the first stream (405).

Statement 11. An embodiment of the inventive concept includes a method according to statement 10, wherein:
receiving (1020) an identifier for a first stream (405) from a host (105) at a storage device (120) includes receiving (1020) the identifier for the first stream (405) from the host (105) at a Solid State Drive (SSD) (120);
receiving (1030) a first Quality of Service (QoS) attribute (620) for the first stream (405) from the host (105) at the storage device (120) includes receiving (1030) the first QoS attribute (620) for the first stream (405) from the host (105) at the SSD (120); and responding (1040) to first requests (345, 350, 415) for the first stream (405) and second requests (420, 425, 430, 435, 440) at the storage device (120) includes responding (1040) to the first requests (345, 350, 415) for the first stream (405) and the second requests (420, 425, 430, 435, 440) at the SSD (120) in the manner that satisfies the first QoS attribute (620) for the first stream (405).

Statement 12. An embodiment of the inventive concept includes a method according to statement 10, wherein:
the method further comprises:
receiving (1105) an identifier for a second stream (410), the identifier for the second stream (410) identifying a second stream (410); and
receiving (1115) a second QoS attribute (620) for the second stream (410); and
responding (1040) to first requests (345, 350, 415) for the first stream (405) and second requests (420, 425, 430, 435, 440) at the storage device (120) in a manner that satisfies the first QoS attribute (620) for the first stream (405) includes responding (1125) to the first requests (345, 350, 415) for the first stream (405) and the second requests (420, 425, 430) for the second stream (410) at the storage device (120) in the manner that satisfies the first QoS attribute (620) for the first stream (405) and the second QoS attribute (620) for the second stream (410).

Statement 13. An embodiment of the inventive concept includes a method according to statement 12, wherein responding (1040) to the first requests (345, 350, 415) for the first stream (405) and the second requests (420, 425, 430) for the second stream (410) at the storage device (120) in the manner that satisfies the first QoS attribute (620) for the first stream (405) and the second QoS attribute (620) for the second stream (410) further includes:
allocating (1205) a first portion (705) of resources (635, 640, 645) of the storage device (120) to the first stream (405);

allocating (1205) a second portion (710) of the resources (635, 640, 645) of the storage device (120) to the second stream (410);

using (1215) the first portion (705) of the resources (635, 640, 645) of the storage device (120) to respond to the first requests (345, 350, 415) for the first stream (405); and using (1215) the second portion (710) of the resources (635, 640, 645) of the storage device (120) to respond to the second requests (420, 425, 430) for the second stream (410).

Statement 14. An embodiment of the inventive concept includes a method according to statement 13, wherein responding (1040) to first requests (345, 350, 415) for the first stream (405) and second requests (420, 425, 430, 435, 440) at the storage device (120) in a manner that satisfies the first QoS attribute (620) for the first stream (405) further includes using (1220) a remaining portion (715) of the resources (635, 640, 645) of the storage device (120) to respond to third requests (435, 440).

Statement 15. An embodiment of the inventive concept includes a method according to statement 10, wherein responding (1040) to first requests (345, 350, 415) for the first stream (405) and second requests (420, 425, 430, 435, 440) at the storage device (120) in a manner that satisfies the first QoS attribute (620) for the first stream (405) includes:

allocating (1205) a first portion (705) of resources (635, 640, 645) of the storage device (120) to the first stream (405);

using (1215) the first portion (705) of the resources (635, 640, 645) of the storage device (120) to respond to the first requests (345, 350, 415) for the first stream (405); and using (1220) a remaining portion (715) of the resources (635, 640, 645) of the storage device (120) to respond to the second requests (420, 425, 430, 435, 440).

Statement 16. An embodiment of the inventive concept includes a method according to statement 10, wherein the first QoS attribute (620) is drawn from a set including a minimum bandwidth (635), a maximum bandwidth (635), a priority (640), and a maximum latency (645).

Statement 17. An embodiment of the inventive concept includes a method according to statement 10, further comprising:

receiving (1005) a request at the storage device (120) for information about unallocated resources (635, 640, 645) from the host (105) at the storage device (120); and sending (1010) the information about the unallocated resources (635, 640, 645) about the storage device (120) to the host (105).

Statement 18. An embodiment of the inventive concept includes a method according to statement 17, wherein sending (1010) the information about the unallocated resources (635, 640, 645) from the storage device (120) to the host (105) includes sending (1015) information about capabilities of the storage device (120) to the host (105).

Statement 19. An embodiment of the inventive concept includes a method according to statement 10, wherein receiving (1030) a first Quality of Service (QoS) attribute (620) for the first stream (405) from the host (105) at the storage device (120) includes receiving (1030) a plurality of first Quality of Service (QoS) attributes (620) for the first stream (405) from the host (105) at the storage device (120).

Statement 20. An embodiment of the inventive concept includes a method according to statement 10, wherein responding (1040) to first requests (345, 350, 415) for the first stream (405) and second requests (420, 425, 430, 435, 440) at the storage device (120) in a manner that satisfies the first QoS attribute (620) for the first stream (405) includes scheduling (1210) the first requests (345, 350, 415) and the second requests (420, 425, 430, 435, 440) to satisfy the first QoS attribute (620) for the first stream (405).

Statement 21. An embodiment of the inventive concept includes a method according to statement 20, wherein scheduling (1210) the first requests (345, 350, 415) and the second requests (420, 425, 430, 435, 440) to satisfy the first QoS attribute (620) for the first stream (405) includes scheduling (1210) the first requests (345, 350, 415) and the second requests (420, 425, 430, 435, 440) using weighted fair queueing.

Statement 22. An embodiment of the inventive concept includes a method according to statement 10, wherein responding (1040) to first requests (345, 350, 415) for the first stream (405) and second requests (420, 425, 430, 435, 440) at the storage device (120) in a manner that satisfies the first QoS attribute (620) for the first stream (405) includes allocating (1205) a minimum bandwidth (635) to satisfying the first requests (345, 350, 415).

Statement 23. An embodiment of the inventive concept includes a method according to statement 10, wherein responding (1040) to first requests (345, 350, 415) for the first stream (405) and second requests (420, 425, 430, 435, 440) at the storage device (120) in a manner that satisfies the first QoS attribute (620) for the first stream (405) includes allocating (1205) a maximum bandwidth (635) to satisfying the first requests (345, 350, 415).

Statement 24. An embodiment of the inventive concept includes a method, comprising:

requesting (1305) information about unallocated resources (635, 640, 645) on a storage device (120) by a host (105);

receiving (1310) the information about the unallocated resources (635, 640, 645) on the storage device (120) at the host (105);

determining (1330) a Quality of Service (QoS) attribute (620) for a stream; and sending (1335) the QoS attribute (620) for the stream from the host (105) to the storage device (120).

Statement 25. An embodiment of the inventive concept includes a method according to statement 24, wherein:

requesting (1305) information about unallocated resources (635, 640, 645) on a storage device (120) includes requesting (1305) the information about unallocated resources (635, 640, 645) on a Solid State Drive (SSD) (120);

receiving (1310) the information about the unallocated resources (635, 640, 645) on the storage device (120) includes receiving (1310) the information about the unallocated resources (635, 640, 645) on the SSD (120); and sending (1335) the QoS attribute (620) for the stream to the storage device (120) includes sending (1335) the QoS attribute (620) for the stream to the SSD (120).

Statement 26. An embodiment of the inventive concept includes a method according to statement 24, wherein:

requesting (1305) information about unallocated resources (635, 640, 645) on a storage device (120) includes requesting (1315) device capabilities of the storage device (120); and receiving (1310) the information about the unallocated resources (635, 640, 645) on the storage device (120) includes receiving (1320) the device capabilities of the storage device (120).

Statement 27. An embodiment of the inventive concept includes a method according to statement 24, wherein the QoS attribute (620) is drawn from a set including a minimum bandwidth (635), a maximum bandwidth (635), a priority (640), and a maximum latency (645).

Statement 28. An embodiment of the inventive concept includes a method according to statement 24, wherein sending (1335) the QoS attribute (620) for the stream from the host (105) to the storage device (120) includes sending (1335) a plurality of QoS attributes (620) for the stream from the host (105) to the storage device (120).

Statement 29. An embodiment of the inventive concept includes a method according to statement 24, further comprising:
opening (1325) the stream;
sending (1340) requests (345, 350, 415) for the stream from the host (105) to the storage device (120); and
closing (1350) the stream.

Statement 30. An embodiment of the inventive concept includes an article, comprising a tangible storage medium, said tangible storage medium having stored thereon non-transitory instructions that, when executed by a machine (105), result in:
receiving (1020) an identifier for a first stream (405) from a host (105) at a storage device (120), the identifier for the first stream (405) identifying a first stream (405);
receiving (1030) a first Quality of Service (QoS) attribute (620) for the first stream (405) from the host (105) at the storage device (120); and
responding (1040) to first requests (345, 350, 415) for the first stream (405) and second requests (420, 425, 430, 435, 440) at the storage device (120) in a manner that satisfies the first QoS attribute (620) for the first stream (405).

Statement 31. An embodiment of the inventive concept includes an article according to statement 30, wherein:
receiving (1020) an identifier for a first stream (405) from a host (105) at a storage device (120) includes receiving (1020) the identifier for the first stream (405) from the host (105) at a Solid State Drive (SSD) (120);
receiving (1030) a first Quality of Service (QoS) attribute (620) for the first stream (405) from the host (105) at the storage device (120) includes receiving (1030) the first QoS attribute (620) for the first stream (405) from the host (105) at the SSD (120); and
responding (1040) to first requests (345, 350, 415) for the first stream (405) and second requests (420, 425, 430, 435, 440) at the storage device (120) includes responding (1040) to the first requests (345, 350, 415) for the first stream (405) and the second requests (420, 425, 430, 435, 440) at the SSD (120) in the manner that satisfies the first QoS attribute (620) for the first stream (405).

Statement 32. An embodiment of the inventive concept includes an article according to statement 30, wherein:
said tangible storage medium has stored thereon further non-transitory instructions that, when executed by the machine (105), result in:
receiving (1105) an identifier for a second stream (410), the identifier for the second stream (410) identifying a second stream (410); and
receiving (1115) a second QoS attribute (620) for the second stream (410); and
responding (1040) to first requests (345, 350, 415) for the first stream (405) and second requests (420, 425, 430, 435, 440) at the storage device (120) in a manner that satisfies the first QoS attribute (620) for the first stream (405) includes responding (1125) to the first requests (345, 350, 415) for the first stream (405) and the second requests (420, 425, 430) for the second stream (410) at the storage device (120) in the manner that satisfies the first QoS attribute (620) for the first stream (405) and the second QoS attribute (620) for the second stream (410).

Statement 33. An embodiment of the inventive concept includes an article according to statement 32, wherein responding (1040) to the first requests (345, 350, 415) for the first stream (405) and the second requests (420, 425, 430) for the second stream (410) at the storage device (120) in the manner that satisfies the first QoS attribute (620) for the first stream (405) and the second QoS attribute (620) for the second stream (410) further includes:
allocating (1205) a first portion (705) of resources (635, 640, 645) of the storage device (120) to the first stream (405);
allocating (1205) a second portion (710) of the resources (635, 640, 645) of the storage device (120) to the second stream (410);
using (1215) the first portion (705) of the resources (635, 640, 645) of the storage device (120) to respond to the first requests (345, 350, 415) for the first stream (405); and
using (1215) the second portion (710) of the resources (635, 640, 645) of the storage device (120) to respond to the second requests (420, 425, 430) for the second stream (410).

Statement 34. An embodiment of the inventive concept includes an article according to statement 33, wherein responding (1040) to first requests (345, 350, 415) for the first stream (405) and second requests (420, 425, 430, 435, 440) at the storage device (120) in a manner that satisfies the first QoS attribute (620) for the first stream (405) further includes using (1220) a remaining portion (715) of the resources (635, 640, 645) of the storage device (120) to respond to third requests (435, 440).

Statement 35. An embodiment of the inventive concept includes an article according to statement 30, wherein responding (1040) to first requests (345, 350, 415) for the first stream (405) and second requests (420, 425, 430, 435, 440) at the storage device (120) in a manner that satisfies the first QoS attribute (620) for the first stream (405) includes:
allocating (1205) a first portion (705) of resources (635, 640, 645) of the storage device (120) to the first stream (405);
using (1215) the first portion (705) of the resources (635, 640, 645) of the storage device (120) to respond to the first requests (345, 350, 415) for the first stream (405); and
using (1220) a remaining portion (715) of the resources (635, 640, 645) of the storage device (120) to respond to the second requests (420, 425, 430, 435, 440).

Statement 36. An embodiment of the inventive concept includes an article according to statement 30, wherein the first QoS attribute (620) is drawn from a set including a minimum bandwidth (635), a maximum bandwidth (635), a priority (640), and a maximum latency (645).

Statement 37. An embodiment of the inventive concept includes an article according to statement 30, said tangible storage medium having stored thereon further non-transitory instructions that, when executed by the machine (105), result in:
receiving (1005) a request at the storage device (120) for information about unallocated resources (635, 640, 645) from the host (105) at the storage device (120); and
sending (1010) the information about the unallocated resources (635, 640, 645) about the storage device (120) to the host (105).

Statement 38. An embodiment of the inventive concept includes an article according to statement 37, wherein sending (1010) the information about the unallocated resources (635, 640, 645) from the storage device (120) to the host (105) includes sending (1015) information about capabilities of the storage device (120) to the host (105).

Statement 39. An embodiment of the inventive concept includes an article according to statement 30, wherein receiving (1030) a first Quality of Service (QoS) attribute (620) for the first stream (405) from the host (105) at the storage device (120) includes receiving (1030) a plurality of first Quality of Service (QoS) attributes (620) for the first stream (405) from the host (105) at the storage device (120).

Statement 40. An embodiment of the inventive concept includes an article according to statement 30, wherein responding (1040) to first requests (345, 350, 415) for the first stream (405) and second requests (420, 425, 430, 435, 440) at the storage device (120) in a manner that satisfies the first QoS attribute (620) for the first stream (405) includes scheduling (1210) the first requests (345, 350, 415) and the second requests (420, 425, 430, 435, 440) to satisfy the first QoS attribute (620) for the first stream (405).

Statement 41. An embodiment of the inventive concept includes an article according to statement 40, wherein scheduling (1210) the first requests (345, 350, 415) and the second requests (420, 425, 430, 435, 440) to satisfy the first QoS attribute (620) for the first stream (405) includes scheduling (1210) the first requests (345, 350, 415) and the second requests (420, 425, 430, 435, 440) using weighted fair queueing.

Statement 42. An embodiment of the inventive concept includes an article according to statement 30, wherein responding (1040) to first requests (345, 350, 415) for the first stream (405) and second requests (420, 425, 430, 435, 440) at the storage device (120) in a manner that satisfies the first QoS attribute (620) for the first stream (405) includes allocating (1205) a minimum bandwidth (635) to satisfying the first requests (345, 350, 415).

Statement 43. An embodiment of the inventive concept includes an article according to statement 30, wherein responding (1040) to first requests (345, 350, 415) for the first stream (405) and second requests (420, 425, 430, 435, 440) at the storage device (120) in a manner that satisfies the first QoS attribute (620) for the first stream (405) includes allocating (1205) a maximum bandwidth (635) to satisfying the first requests (345, 350, 415).

Statement 44. An embodiment of the inventive concept includes an article, comprising a tangible storage medium, said tangible storage medium having stored thereon non-transitory instructions that, when executed by a machine (105), result in:
  requesting (1305) information about unallocated resources (635, 640, 645) on a storage device (120) by a host (105);
  receiving (1310) the information about the unallocated resources (635, 640, 645) on the storage device (120) at the host (105);
  determining (1330) a Quality of Service (QoS) attribute (620) for a stream; and
  sending (1335) the QoS attribute (620) for the stream from the host (105) to the storage device (120).

Statement 45. An embodiment of the inventive concept includes an article according to statement 44, wherein:
  requesting (1305) information about unallocated resources (635, 640, 645) on a storage device (120) includes requesting (1305) the information about unallocated resources (635, 640, 645) on a Solid State Drive (SSD) (120);
  receiving (1310) the information about the unallocated resources (635, 640, 645) on the storage device (120) includes receiving (1310) the information about the unallocated resources (635, 640, 645) on the SSD (120); and
  sending (1335) the QoS attribute (620) for the stream to the storage device (120) includes sending (1335) the QoS attribute (620) for the stream to the SSD (120).

Statement 46. An embodiment of the inventive concept includes an article according to statement 44, wherein:
  requesting (1305) information about unallocated resources (635, 640, 645) on a storage device (120) includes requesting (1315) device capabilities of the storage device (120); and
  receiving (1310) the information about the unallocated resources (635, 640, 645) on the storage device (120) includes receiving (1320) the device capabilities of the storage device (120).

Statement 47. An embodiment of the inventive concept includes an article according to statement 44, wherein the QoS attribute (620) is drawn from a set including a minimum bandwidth (635), a maximum bandwidth (635), a priority (640), and a maximum latency (645).

Statement 48. An embodiment of the inventive concept includes an article according to statement 44, wherein sending (1335) the QoS attribute (620) for the stream from the host (105) to the storage device (120) includes sending (1335) a plurality of QoS attributes (620) for the stream from the host (105) to the storage device (120).

Statement 49. An embodiment of the inventive concept includes an article according to statement 44, said tangible storage medium having stored thereon further non-transitory instructions that, when executed by the machine (105), result in:
  opening (1325) the stream;
  sending (1340) requests (345, 350, 415) for the stream from the host (105) to the storage device (120); and
  closing (1350) the stream.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A method, comprising:
  receiving a first identifier for a first stream from a host at a storage device, the identifier for the first stream identifying a first stream;
  receiving a first Quality of Service (QoS) attribute for the first stream from the host at the storage device; and
  receiving a second identifier for a second stream from the host at the storage device, the second identifier for the second stream identifying a second stream;
  receiving a second QoS attribute for the second stream from the host at the storage device;
  receiving first requests for the first stream and second requests for the second stream at the storage device;
  storing the first requests for the first stream and the second requests for the second stream in an event queue in the storage device out of order; and
  responding to the first requests for the first stream and the second requests for the second stream at the storage device in a manner that enhances data access from the storage device by satisfying the first QoS attribute for the first stream and the second QoS attribute for the second stream.

2. A method according to claim 1, wherein the responding to the first requests for the first stream and second requests for the second stream at the storage device in the manner that satisfies the first QoS attribute for the first stream and the second QoS attribute for the second stream includes:
- allocating a first portion of resources of the storage device to the first stream;
- allocating a second portion of the resources of the storage device to the second stream;
- using the first portion of the resources of the storage device to respond to the first requests for the first stream; and
- using the second portion of the resources of the storage device to respond to the second requests for the second stream.

3. A method according to claim 2, wherein the responding to the first requests for the first stream and the second requests for the second stream at the storage device in the manner that satisfies the first QoS attribute for the first stream and the second QoS attribute for the second stream further includes using a remaining portion of the resources of the storage device to respond to third requests not associated with the first stream or the second stream.

4. A method according to claim 1, wherein:
- the receiving of the first identifier for the first stream from the host at the storage device includes the receiving of the first identifier for the first stream from the host at a Solid State Drive (SSD);
- the receiving of the first Quality of Service (QoS) attribute for the first stream from the host at the storage device includes the receiving of the first QoS attribute for the first stream from the host at the SSD;
- the receiving of the second identifier for the second stream from the host at the storage device includes the receiving of the second identifier for the second stream from the host at the SSD;
- the receiving of the second QoS attribute for the second stream from the host at the storage device includes the receiving of the second QoS attribute for the second stream from the host at the SSD;
- the receiving of the first requests for the first stream and second requests for the second stream at the storage device includes the receiving of the first requests for the first stream and the second requests for the second stream at the SSD; and
- the responding to the first requests for the first stream and the second requests for the second stream at the storage device includes the responding to the first requests for the first stream and the second requests for the second stream at the SSD in the manner that satisfies the first QoS attribute for the first stream and the second QoS attribute for the second stream.

5. A method according to claim 1, wherein the first QoS attribute and the second QoS attribute are drawn from a set including a minimum bandwidth, a maximum bandwidth, a stream priority, and a maximum latency.

6. A method according to claim 1, further comprising:
- receiving a request at the storage device for information about unallocated resources from the host at the storage device; and
- sending the information about the unallocated resources about the storage device to the host.

7. A method according to claim 1, wherein the receiving of the first Quality of Service (QoS) attribute for the first stream from the host at the storage device includes the receiving of a plurality of first Quality of Service (QoS) attributes for the first stream from the host at the storage device.

8. A method according to claim 1, wherein the responding to first requests for the first stream and second requests for the second stream at the storage device in the manner that satisfies the first QoS attribute for the first stream and the second QoS attribute for the second stream includes scheduling the first requests and the second requests to satisfy the first QoS attribute for the first stream and the second QoS attribute for the second stream.

9. A method according to claim 1, wherein the responding to first requests for the first stream and second requests for the second stream at the storage device in the manner that satisfies the first QoS attribute for the first stream and the second QoS attribute for the second stream includes allocating a minimum bandwidth to satisfying the first requests.

10. A method according to claim 1, wherein the responding to first requests for the first stream and second requests for the second at the storage device in the manner that satisfies the first QoS attribute for the first stream and the second QoS attribute for the second stream includes allocating a maximum bandwidth to satisfying the first requests.

11. A storage device, comprising:
- memory on the storage device to store data;
- a host interface to receive first requests for a first stream and second requests for a second stream from a host and to place the first requests for the first stream in a first stream request queue and the second requests for the second stream in a second stream request queue; and
- a host interface layer to schedule the first requests and second requests in a manner that enhances data access from the storage device by satisfying a first Quality of Service (QoS) attribute for the first stream and a second QoS attribute for the second stream, including:
  - a stream QoS scheduler to schedule the first requests from the first stream request queue and the second requests from the second stream request queue in an event queue while satisfying the first QoS attribute for the first stream and the second QoS attribute for the second stream, the event queue storing the first requests for the first stream and the second requests for the second stream out of order.

12. A storage device according to claim 11, wherein the storage device includes a Solid State Drive (SSD).

13. A storage device according to claim 11, wherein the host interface layer is operative to allocate a first portion of resources of the storage device to process the first requests for the first stream and a second portion of the resources of the storage device to process the second requests for the second stream.

14. A storage device according to claim 11, wherein the first QoS attribute and the second QoS attribute are drawn from a set including a minimum bandwidth, a maximum bandwidth, a stream priority, and a maximum latency.

* * * * *